United States Patent [19]

Chang et al.

[11] Patent Number: 5,658,545

[45] Date of Patent: Aug. 19, 1997

[54] METAL REGENERATION OF IRON CHELATES IN NITRIC OXIDE SCRUBBING

[75] Inventors: Shih-Ger Chang, El Cerrito; David Littlejohn, Oakland; Yao Shi, Berkeley, all of Calif.

[73] Assignee: The Regents of California, Oakland, Calif.

[21] Appl. No.: 412,706

[22] Filed: Mar. 29, 1995

[51] Int. Cl.⁶ .................................................. B01J 8/00
[52] U.S. Cl. .................................................. 423/239.1
[58] Field of Search ............................. 423/235, 239.1

[56] References Cited

U.S. PATENT DOCUMENTS

| | | | |
|---|---|---|---|
| 4,708,854 | 11/1987 | Grinstead et al. | 423/235 |
| 4,732,744 | 3/1988 | Chang et al. | 423/235 |
| 4,778,664 | 10/1988 | Grinstead | 423/235 |
| 4,810,474 | 3/1989 | Liu e tal. | 423/235 |
| 4,837,361 | 6/1989 | Chang et al. | 562/556 |
| 4,859,437 | 8/1989 | Grinstead et al. | 423/226 |
| 5,073,575 | 12/1991 | Blanch et al. | 521/33 |
| 5,106,601 | 4/1992 | Chang et al. | 423/235 |
| 5,164,167 | 11/1992 | Chang et al. | 423/235 |
| 5,370,849 | 12/1994 | Chang et al. | 423/242 |

FOREIGN PATENT DOCUMENTS 52-8982  1/1977  Japan .
54-6865  1/1979  Japan .

OTHER PUBLICATIONS

*Hawley's Chemical Dictionary*, 1993 (no month) p. 873, 12th edition.
*Encyclopedia of Chemical Reactions*, Jacobson vol. IV pp. 16 and 37 Feb. 1956.

*Primary Examiner*—Gary P. Straub
*Assistant Examiner*—Thomas G. Dunn, Jr.
*Attorney, Agent, or Firm*—Paul Martin

[57] ABSTRACT

The present invention relates to a process of using metal particles to reduce NO to $NH_3$. More specifically, the invention concerns an improved process to regenerate iron (II) (CHELATE) by reduction of iron (II) (CHELATE) (NO) complex, which process comprises: a) contacting an aqueous solution containing iron (II) (CHELATE) (NO) with metal particles at between about 20° and 90° C. to reduce NO present, produce ammonia or an ammonium ion, and produce free iron (II) (CHELATE) at a pH of between about 3 and 8. The process is useful to remove NO from flue gas and reduce pollution.

18 Claims, 19 Drawing Sheets

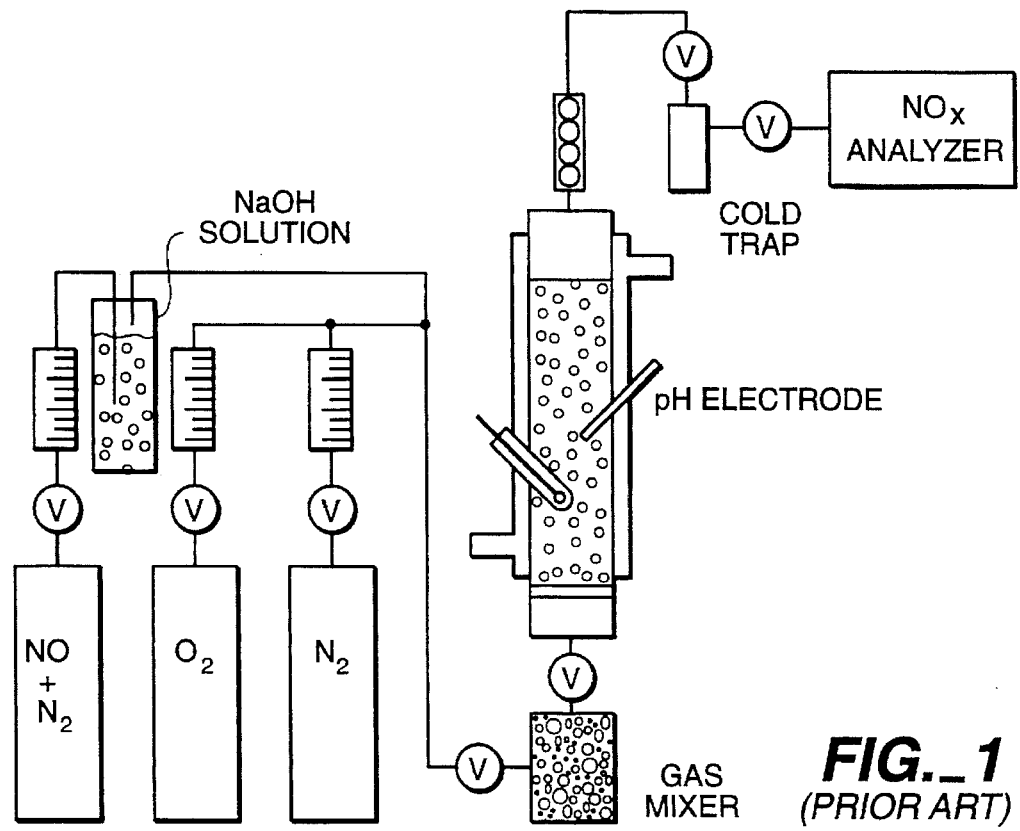
FIG._1 (PRIOR ART)
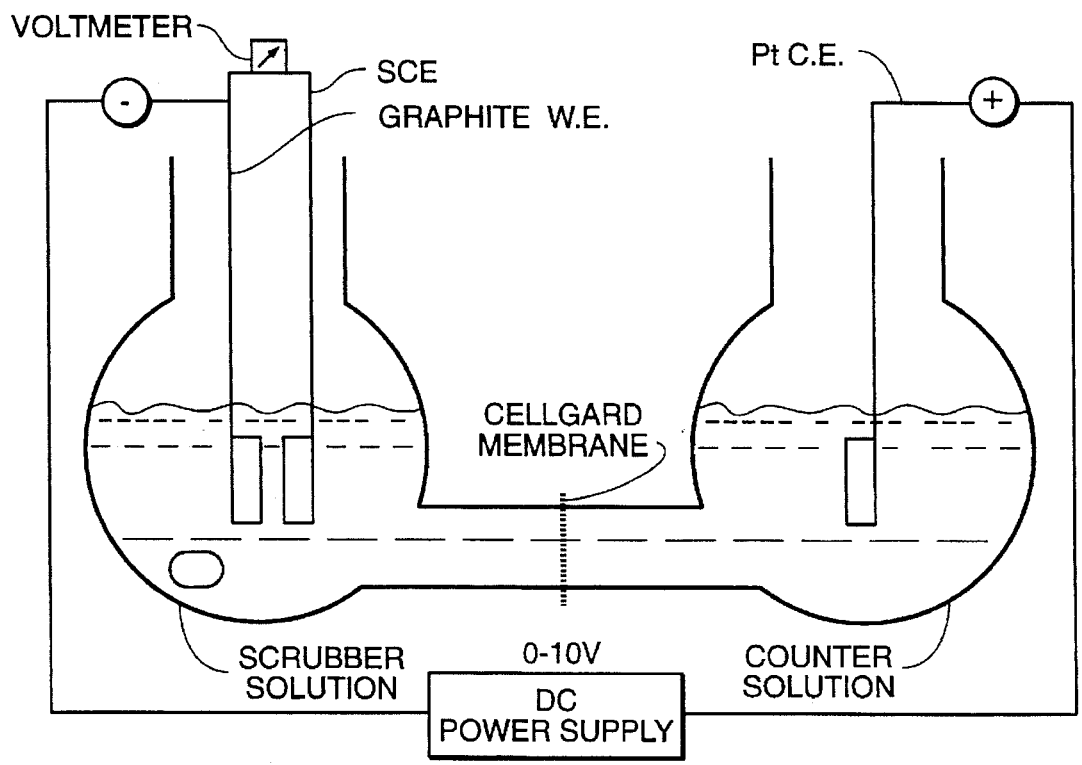
FIG._3

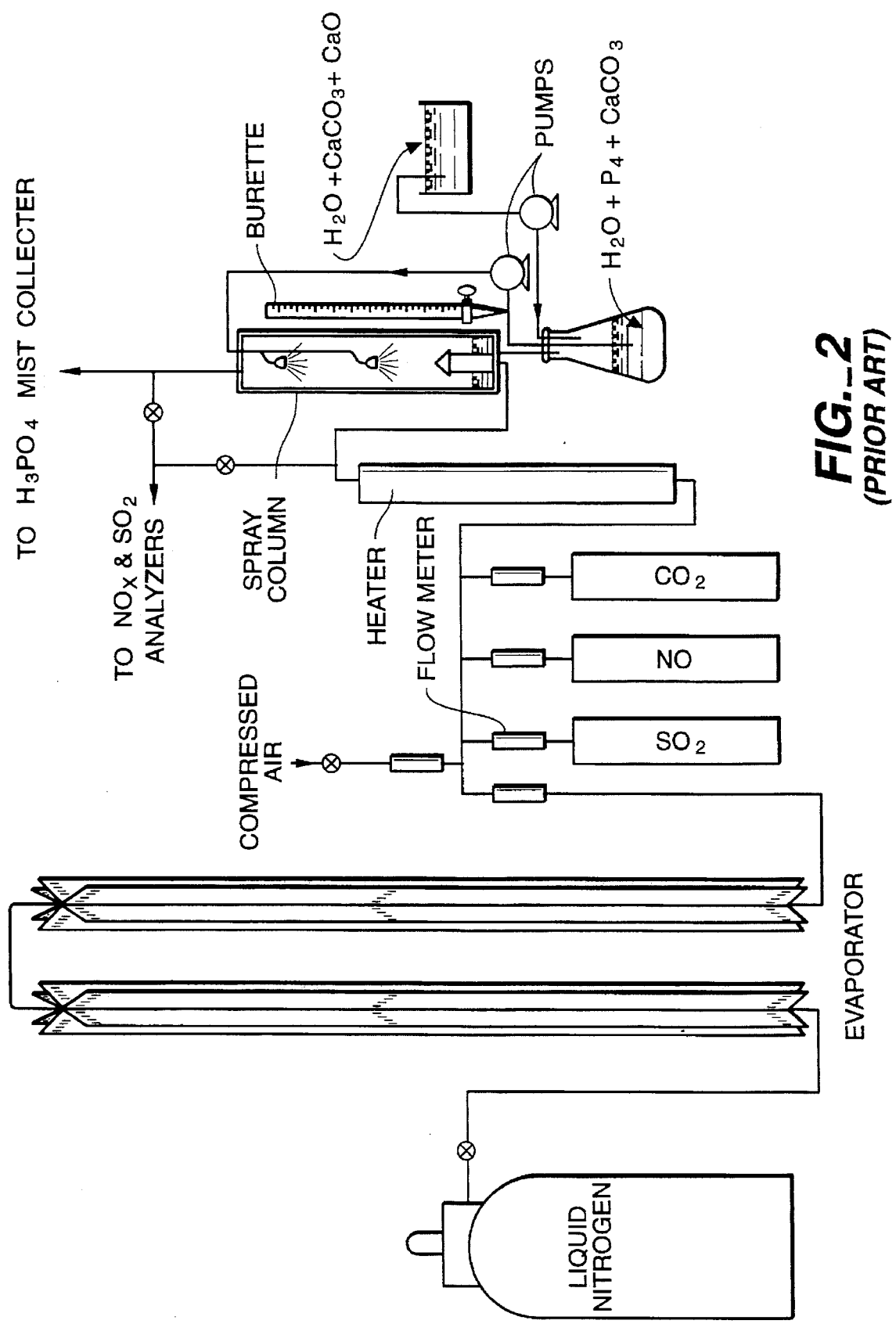
FIG._2 *(PRIOR ART)*

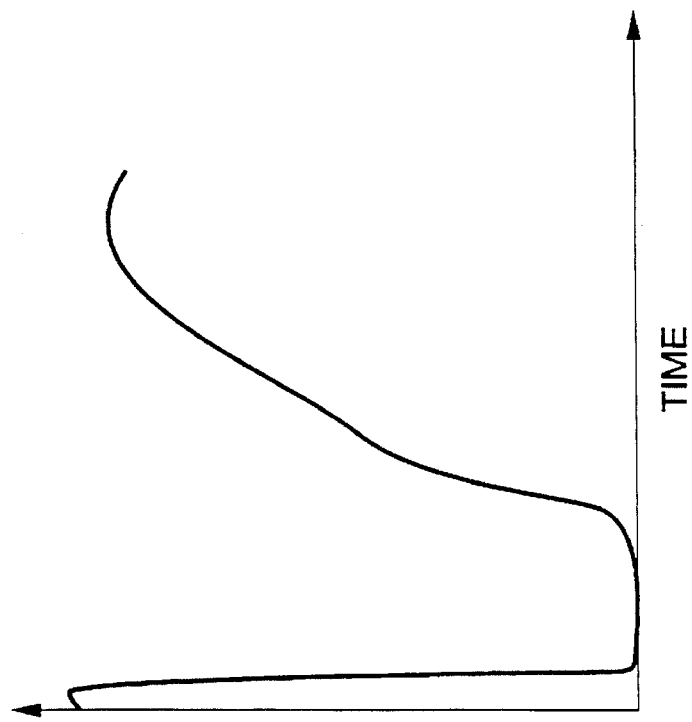
FIG._4B
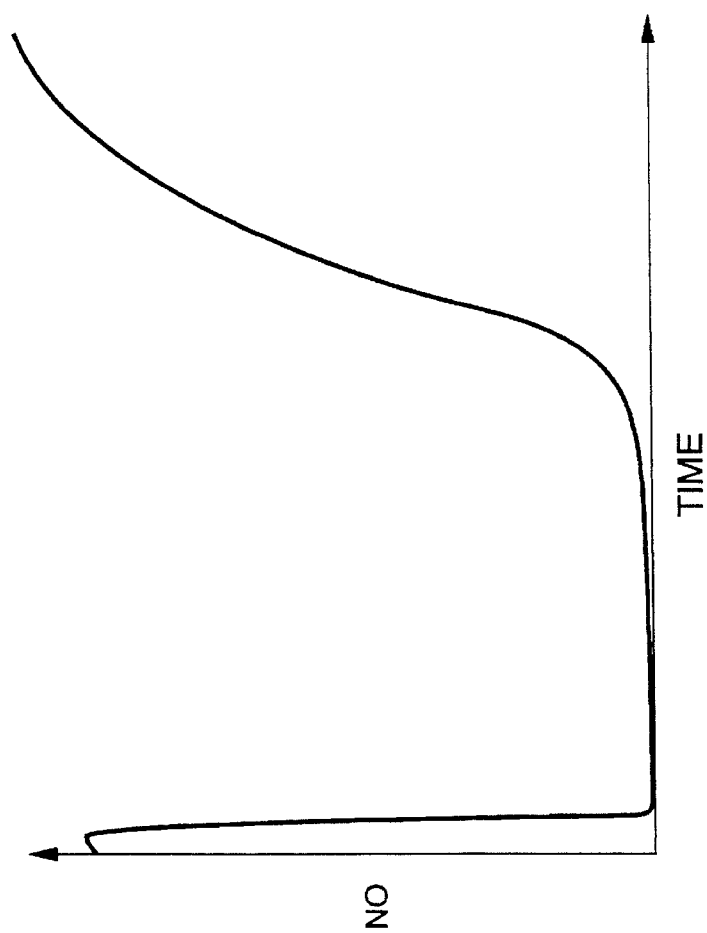
FIG._4A

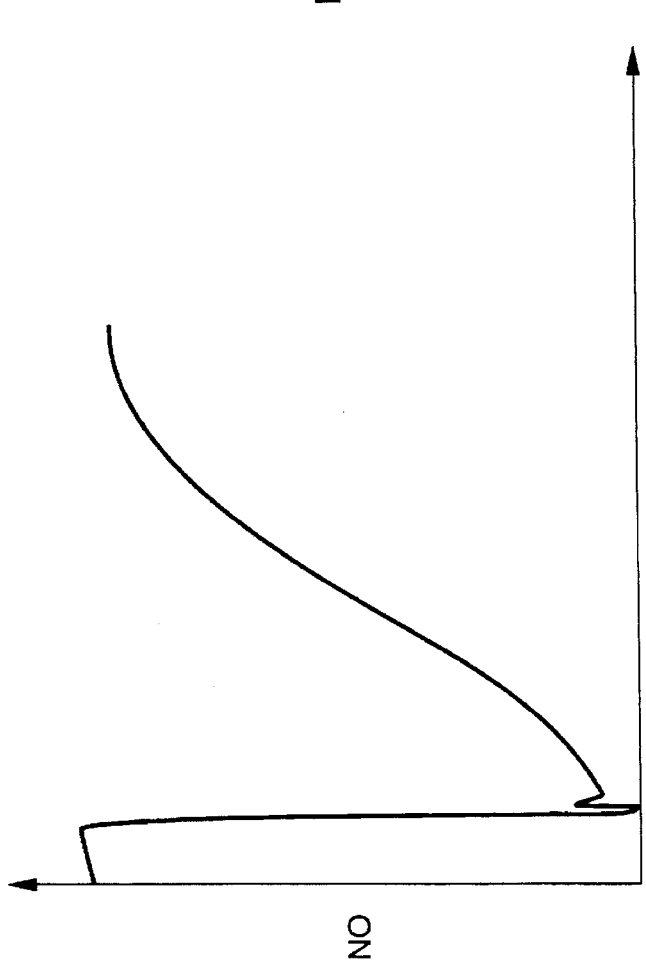
FIG._5A
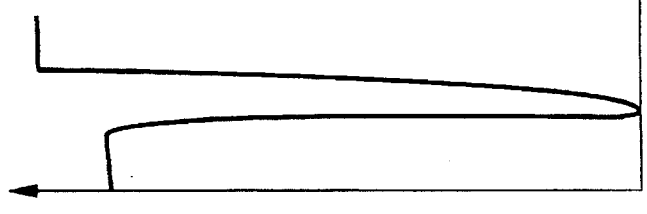
FIG._5B

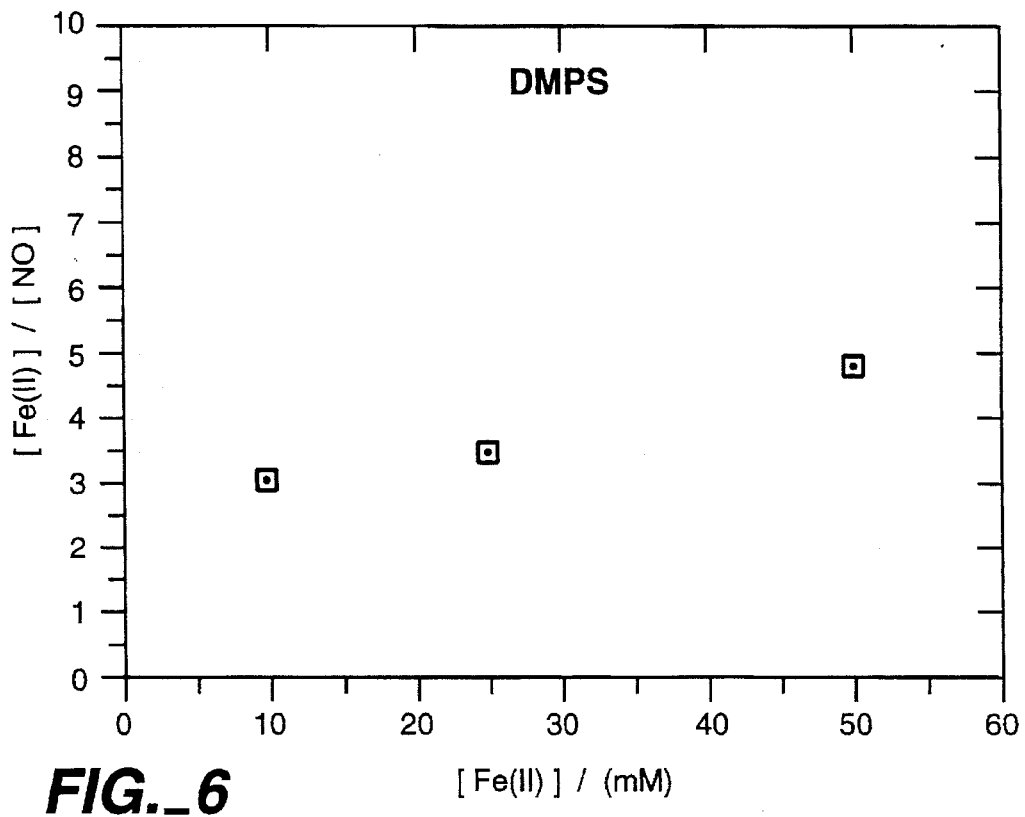
FIG._6
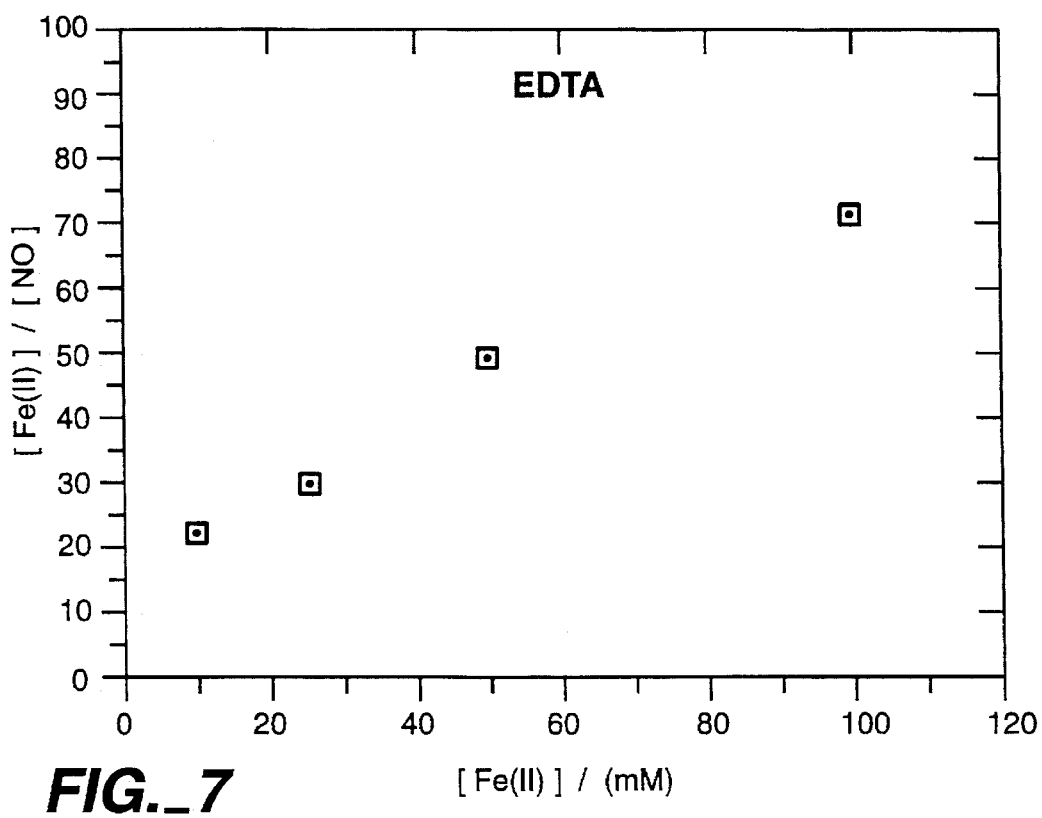
FIG._7

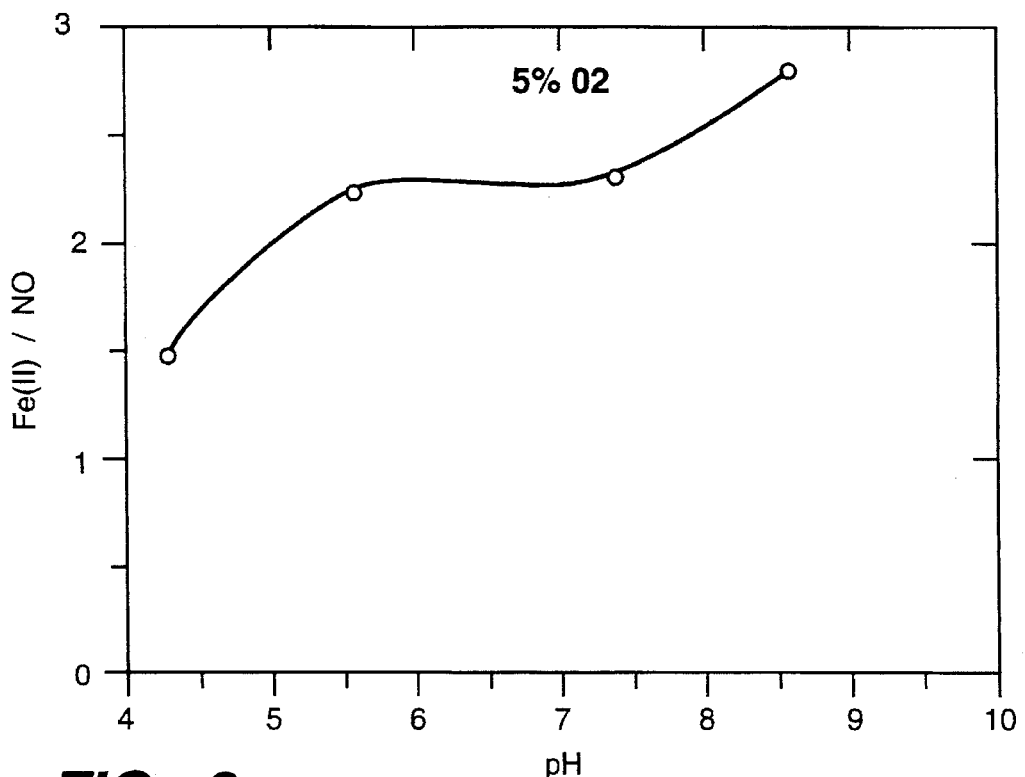
FIG._8
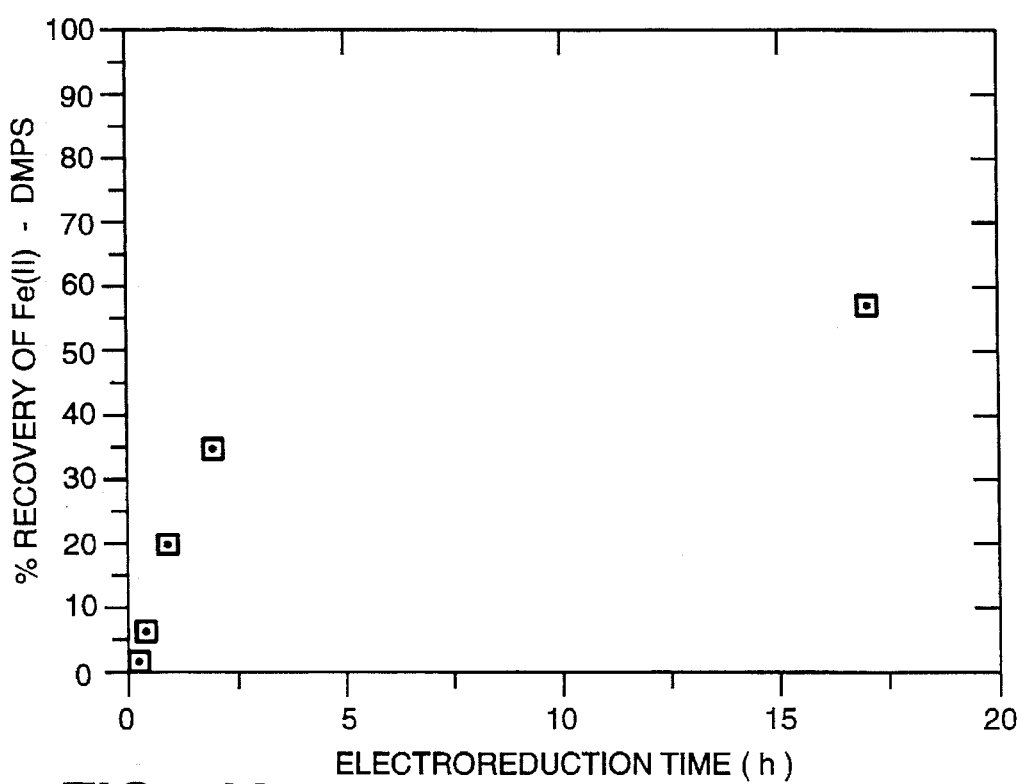
FIG._13

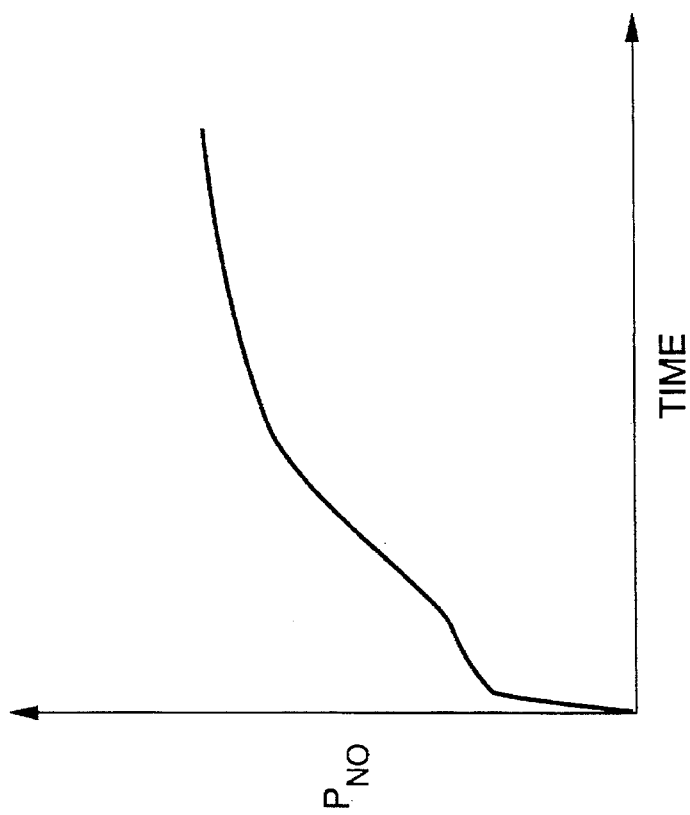
FIG._9B
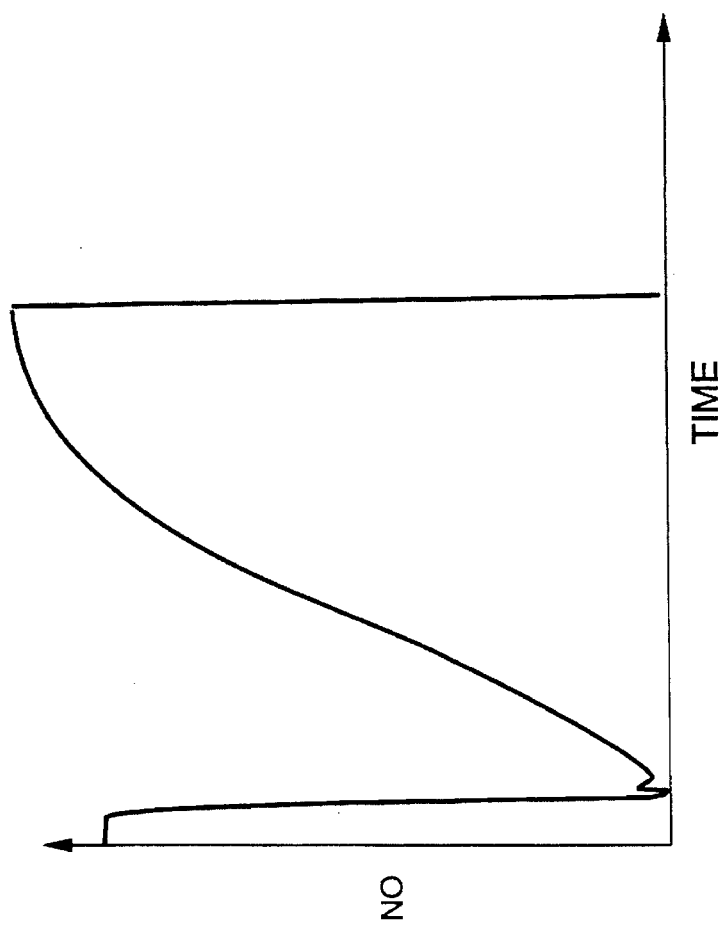
FIG._9A

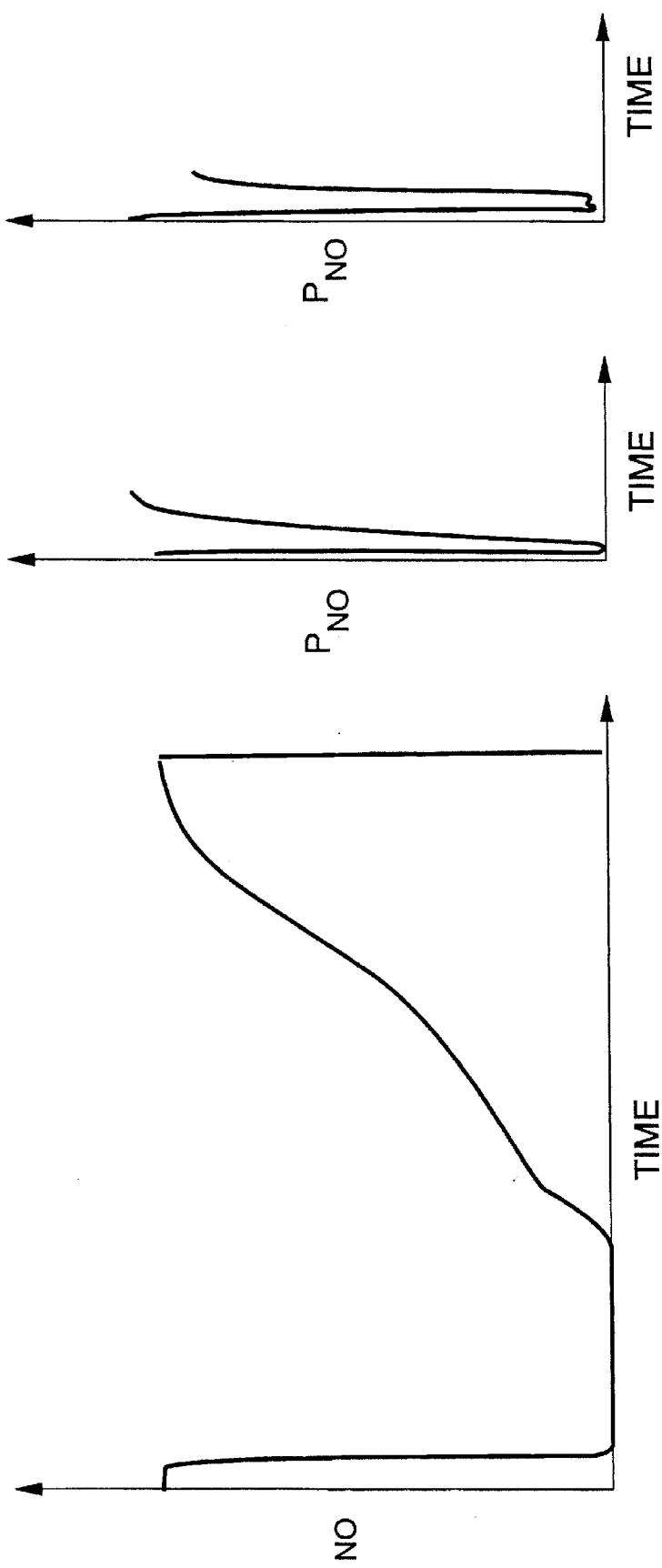

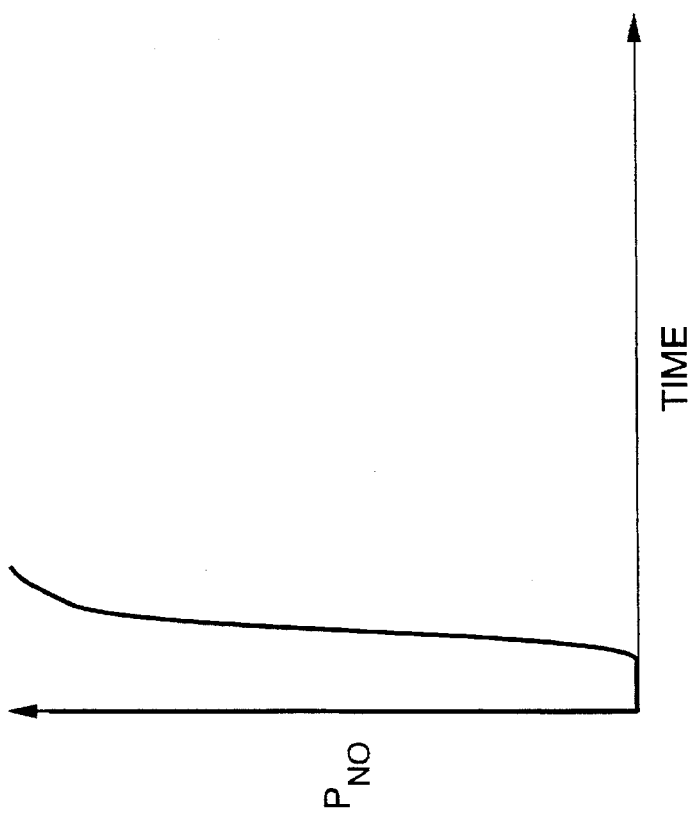
FIG._11B
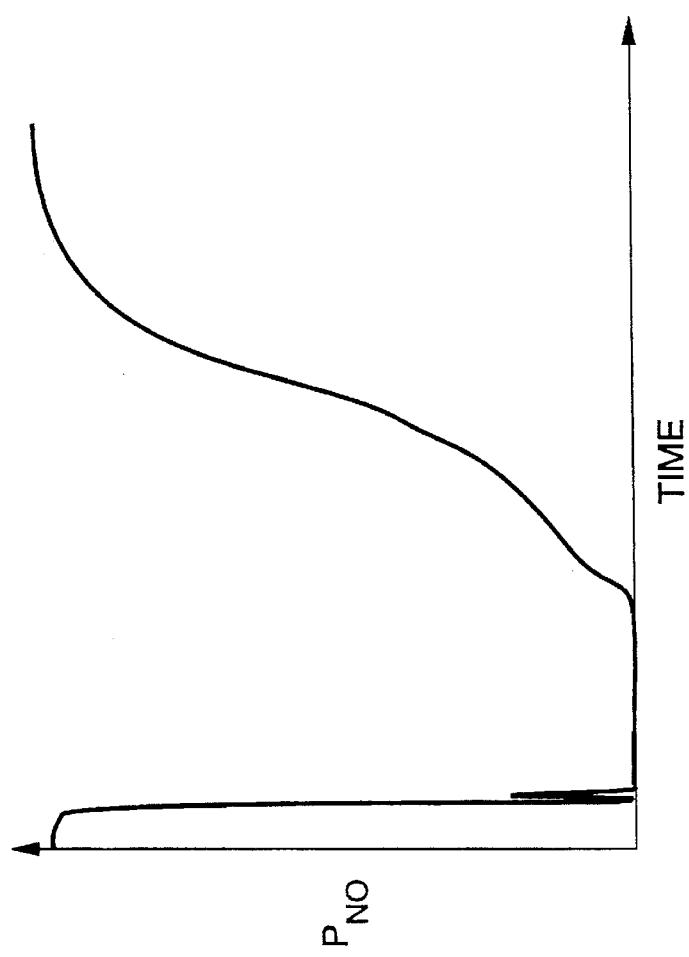
FIG._11A

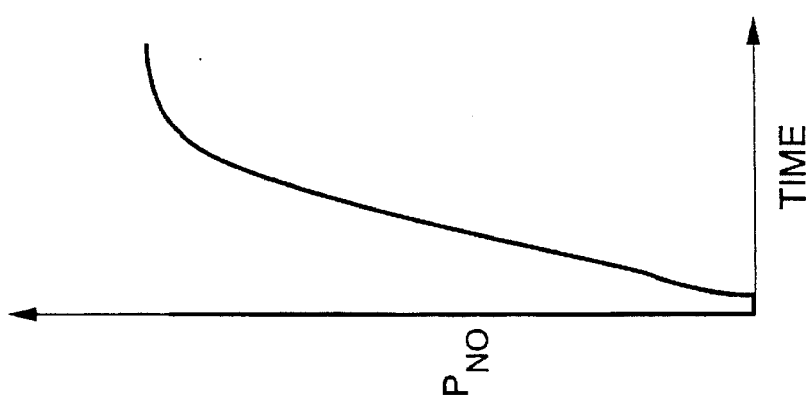
FIG._12C
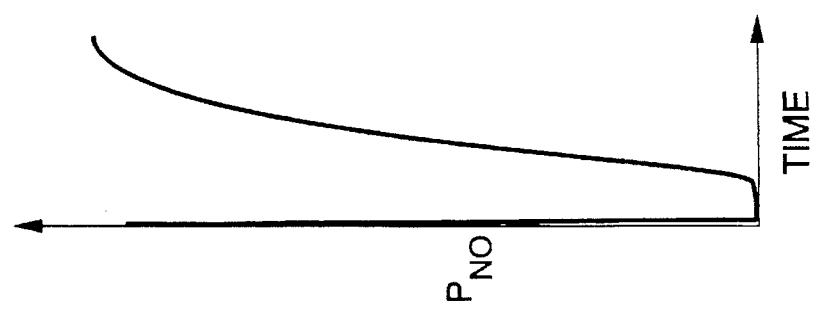
FIG._12B
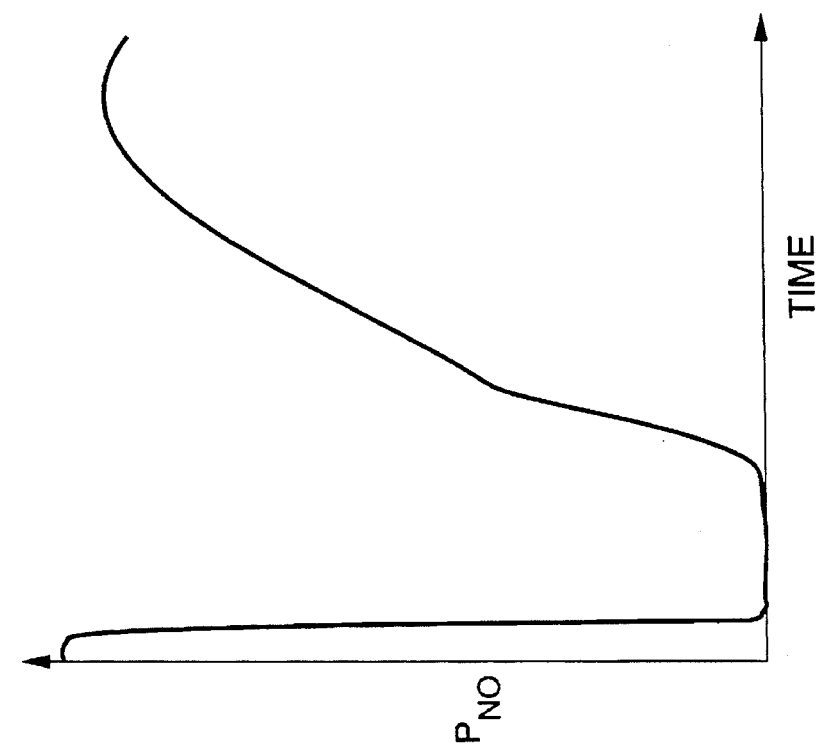
FIG._12A

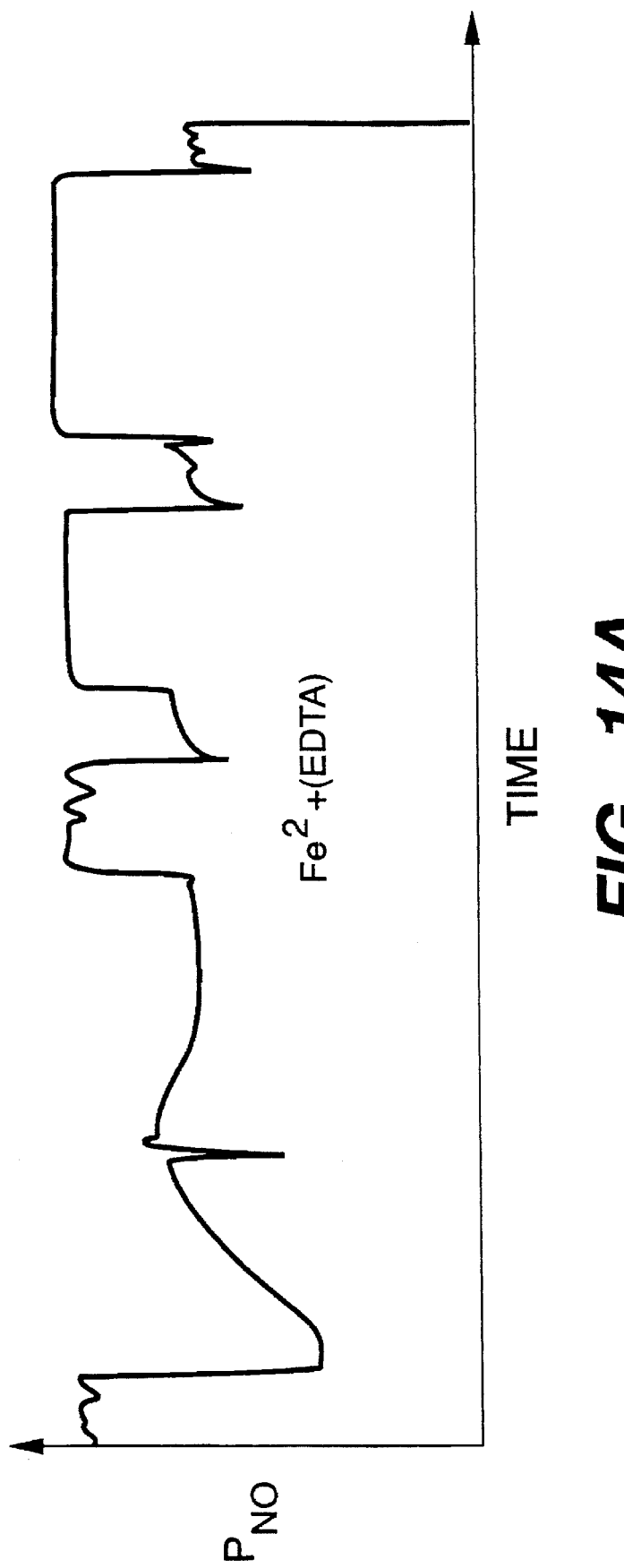
FIG._14A

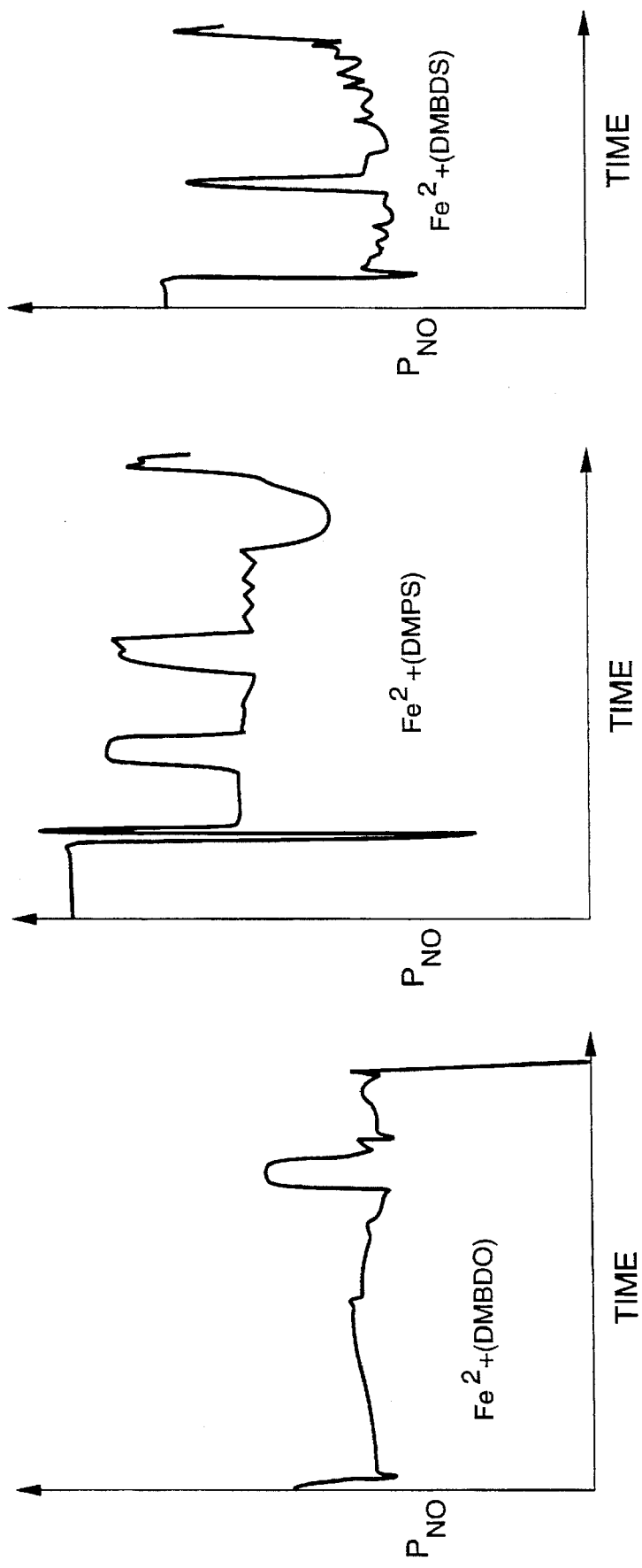

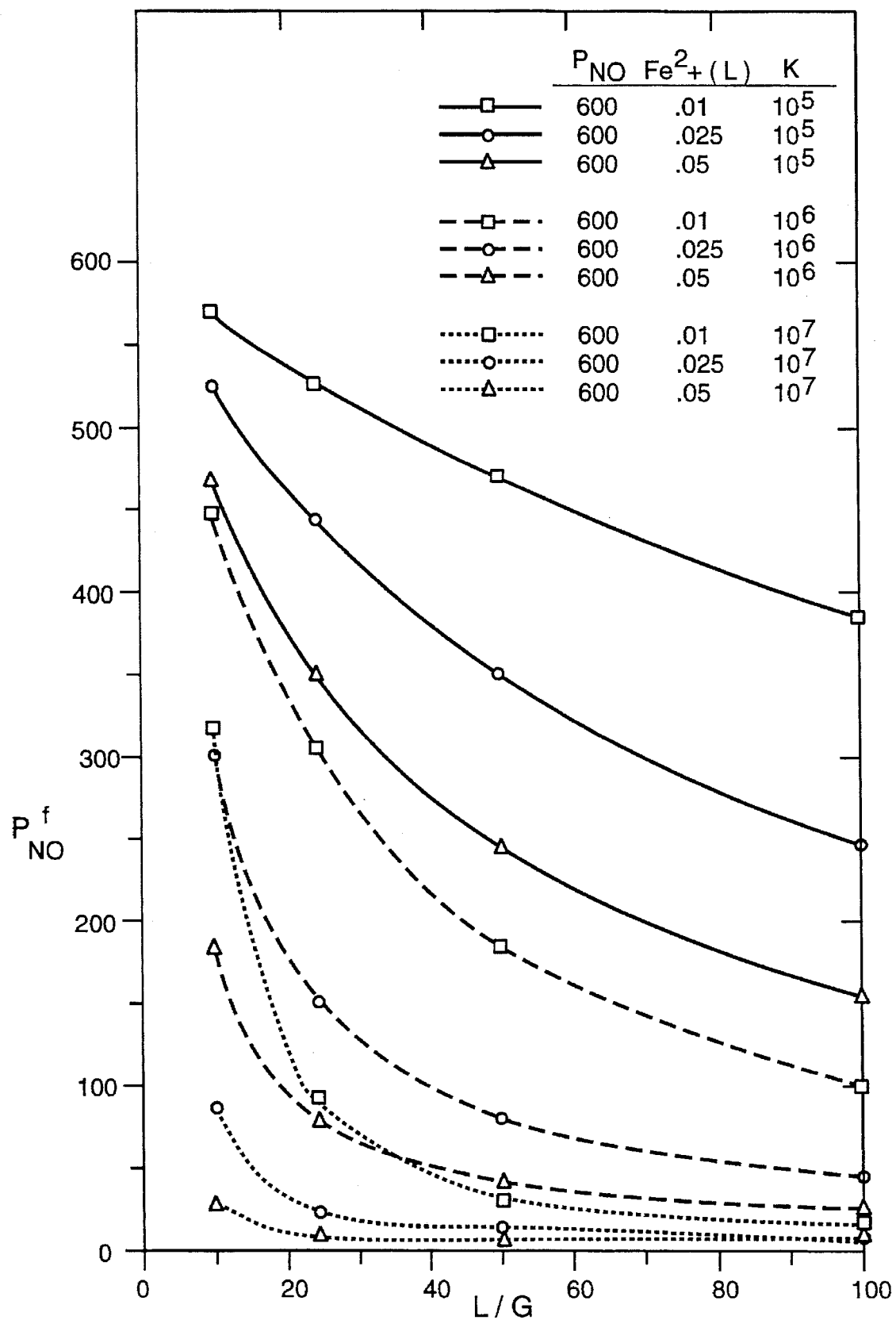
FIG._15

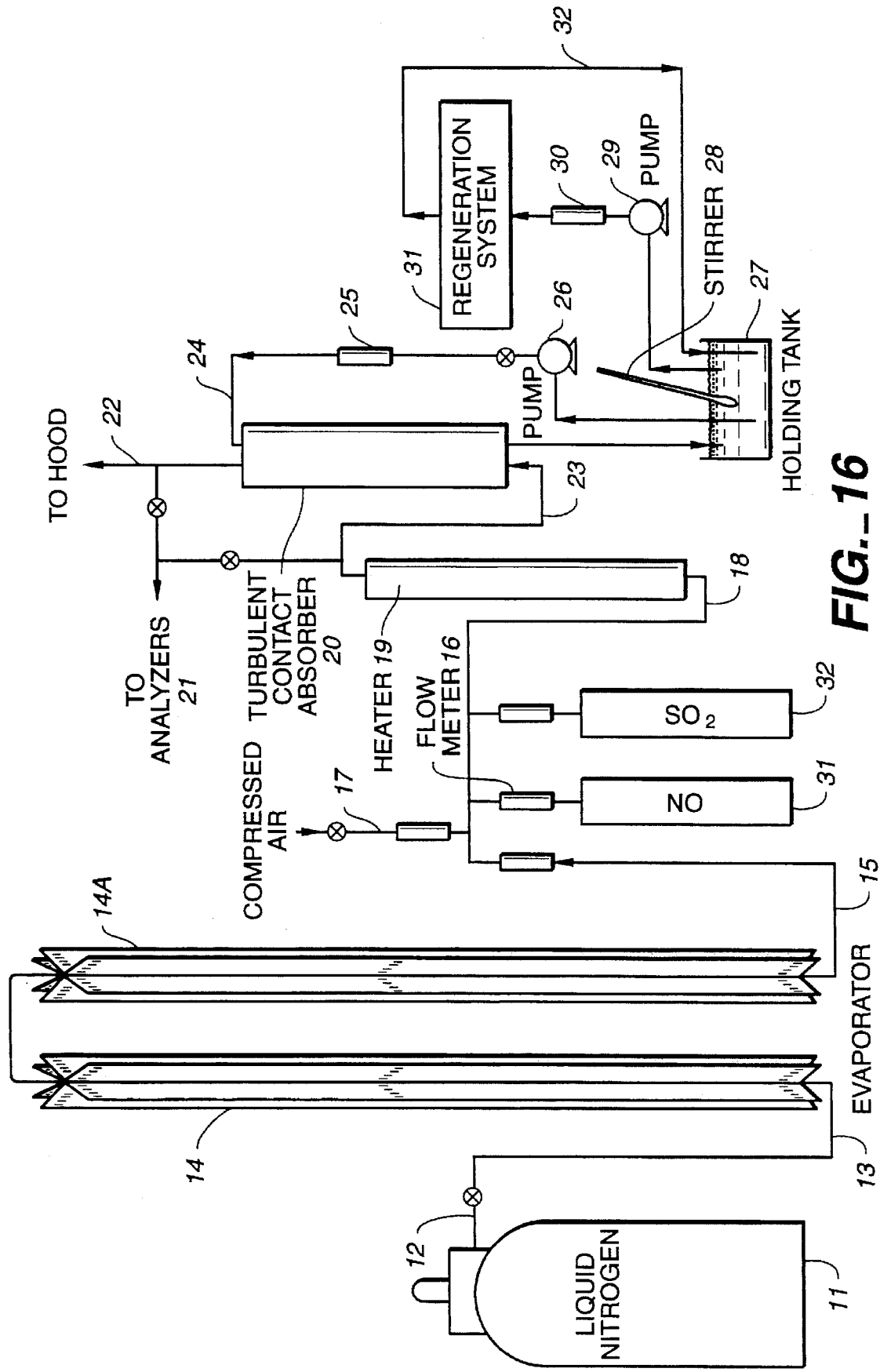
FIG._16

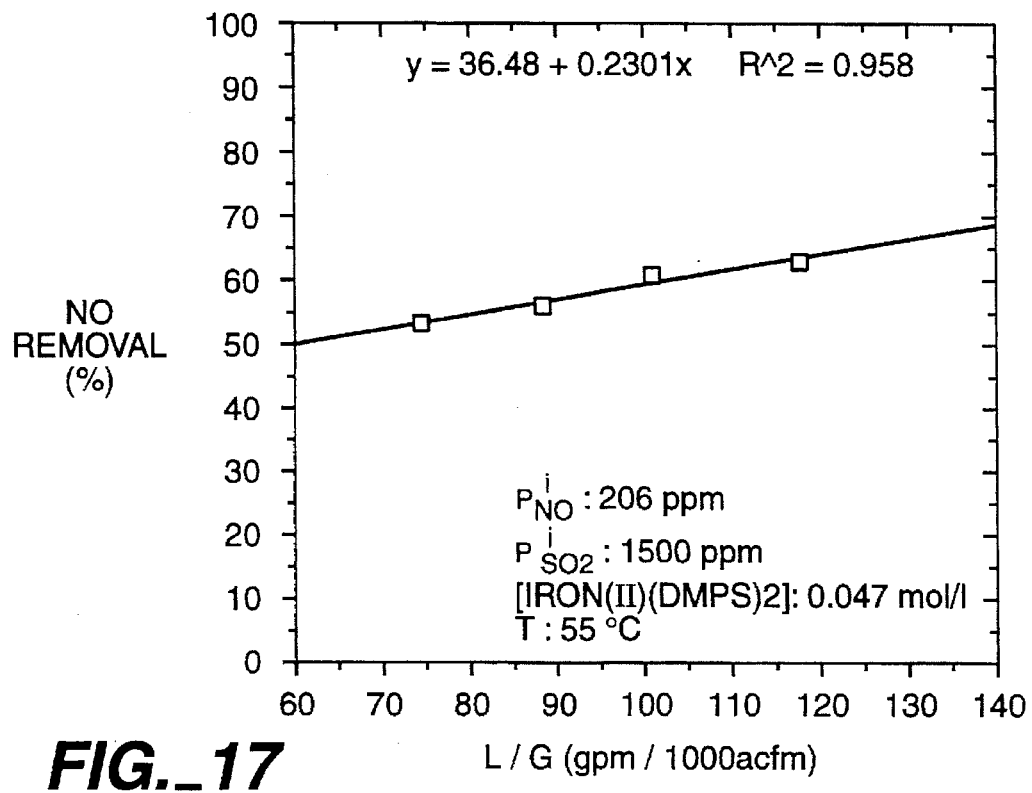
FIG._17
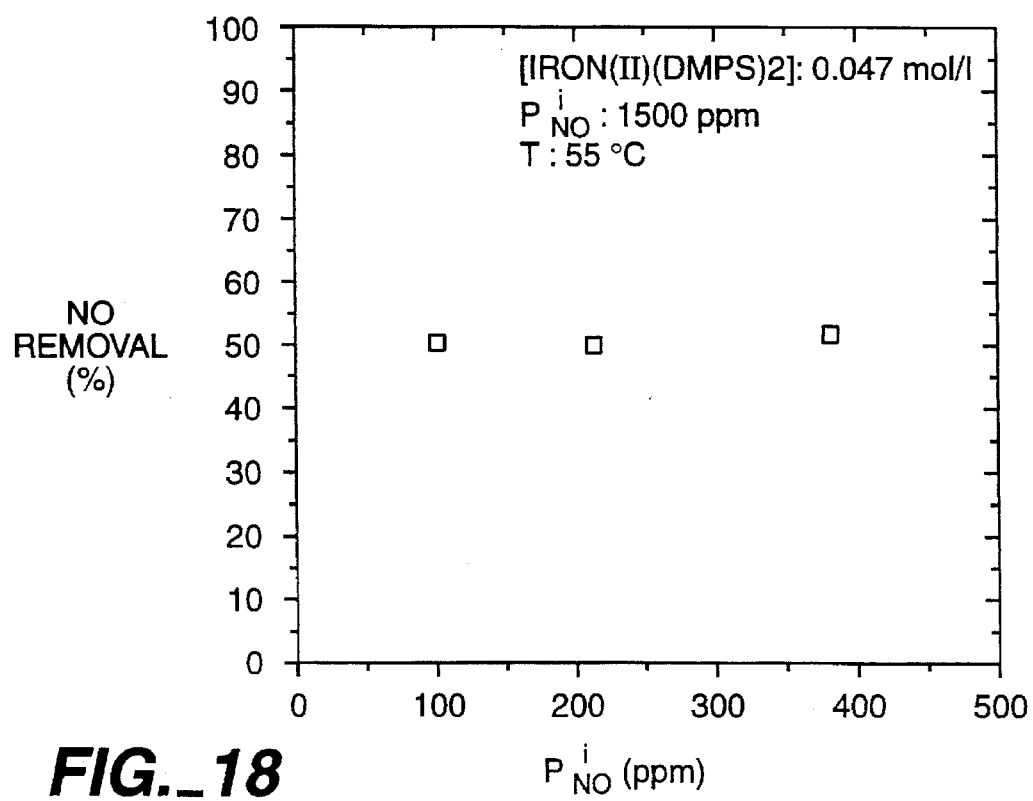
FIG._18

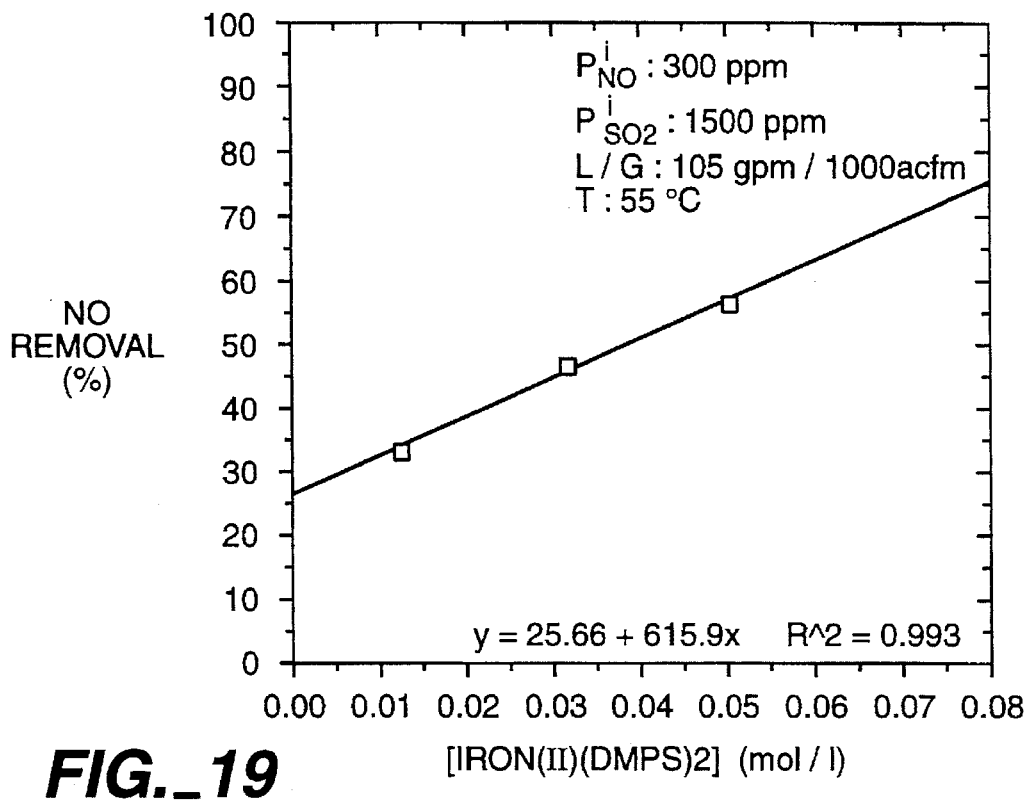
FIG._19
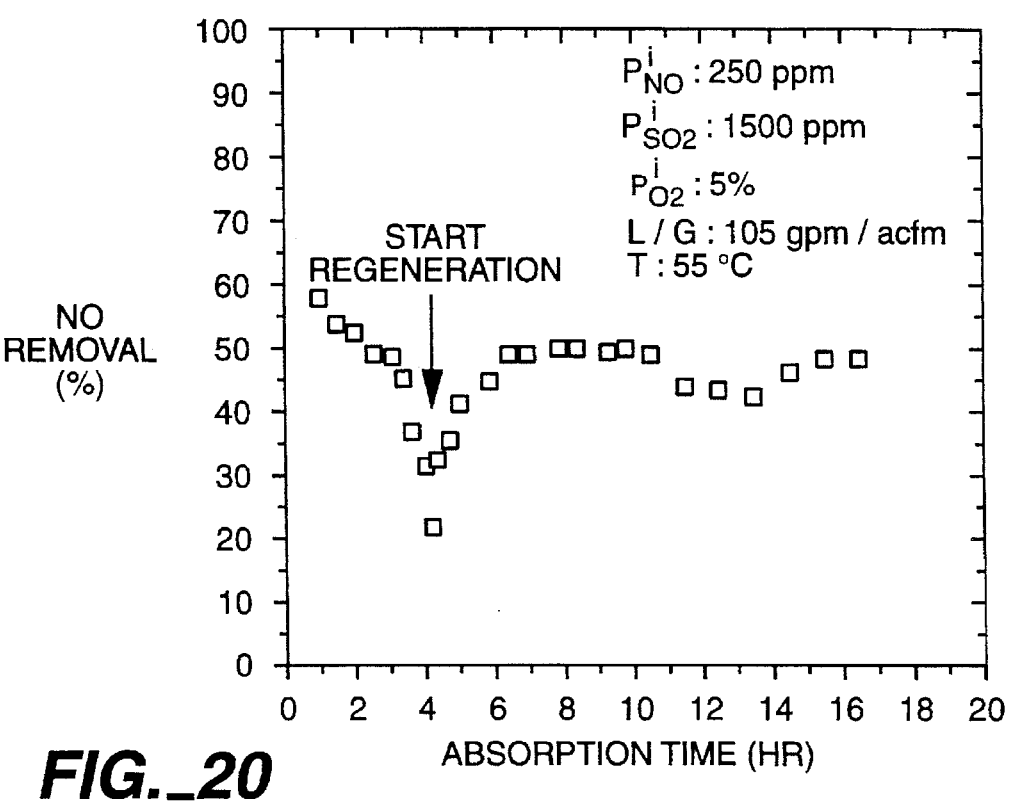
FIG._20

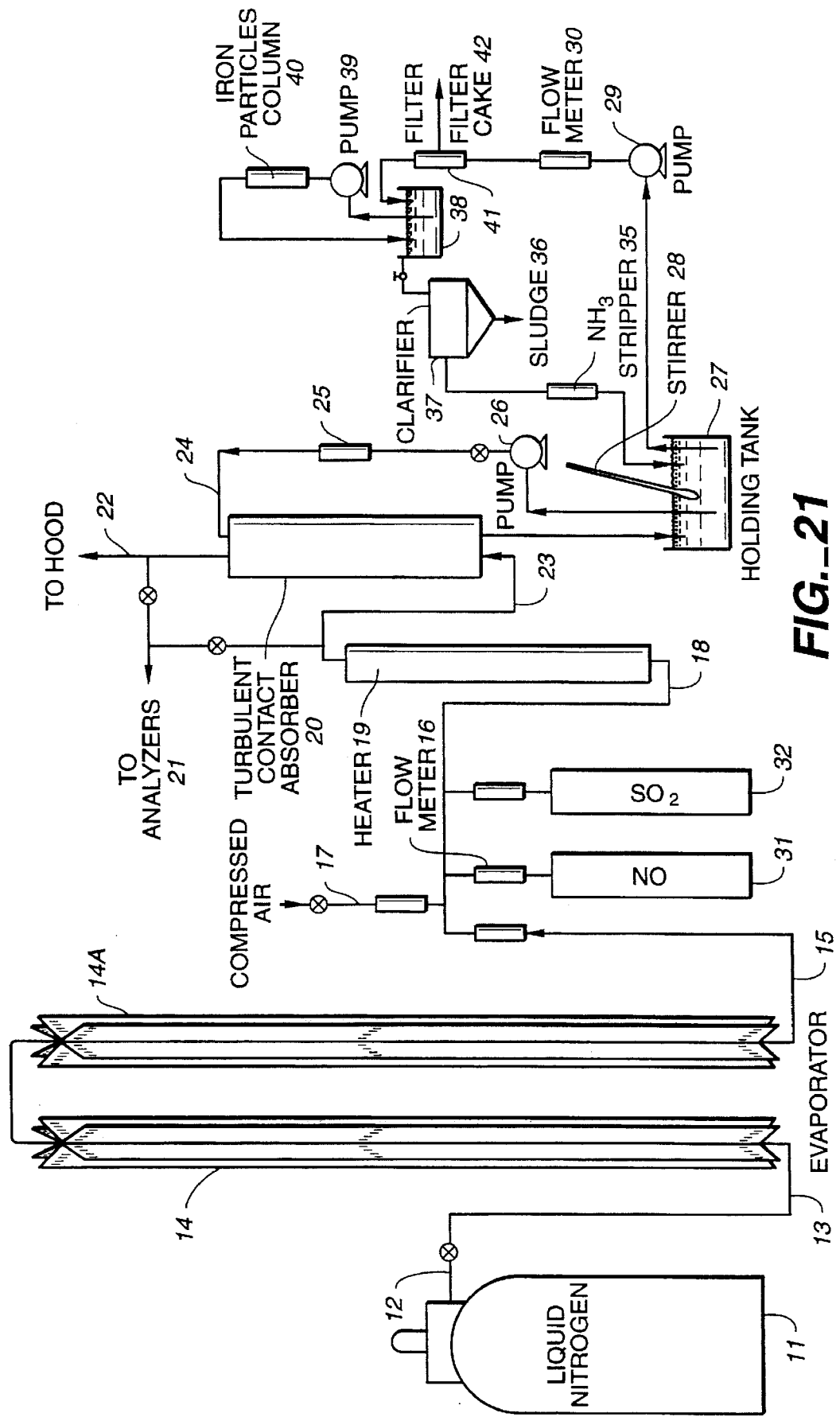
FIG._21

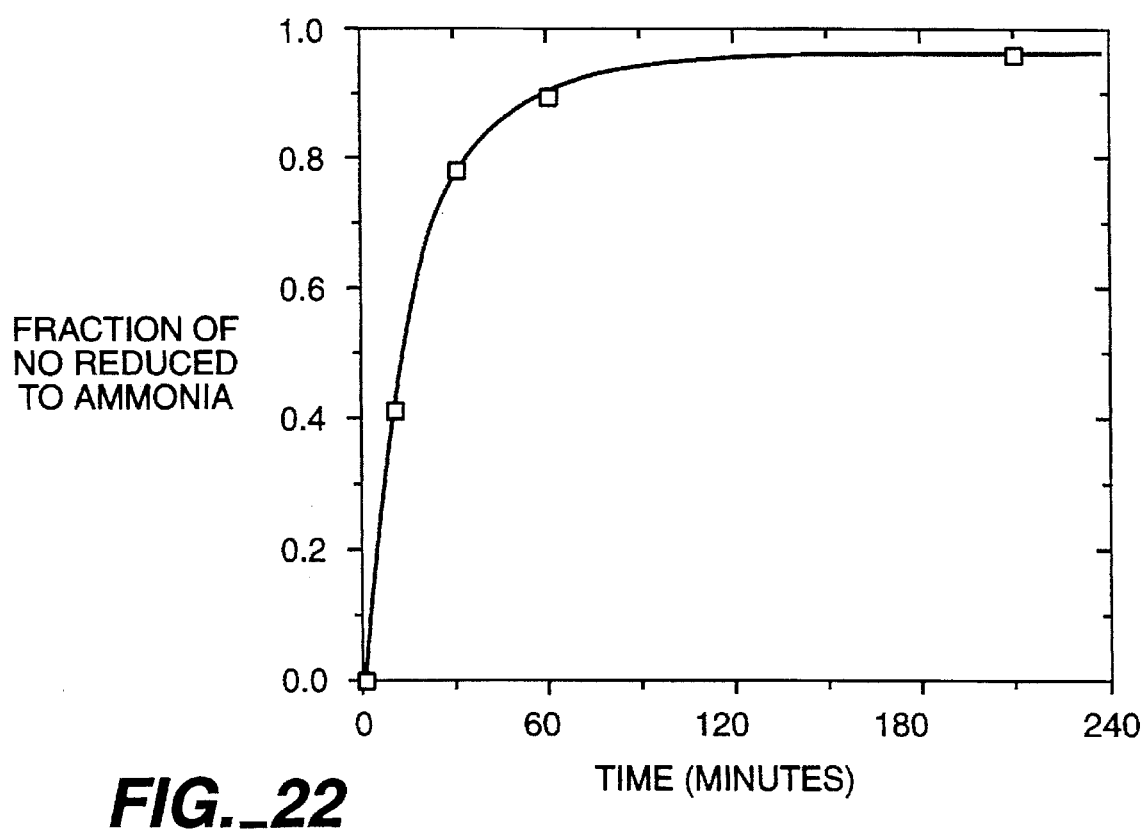
FIG._22

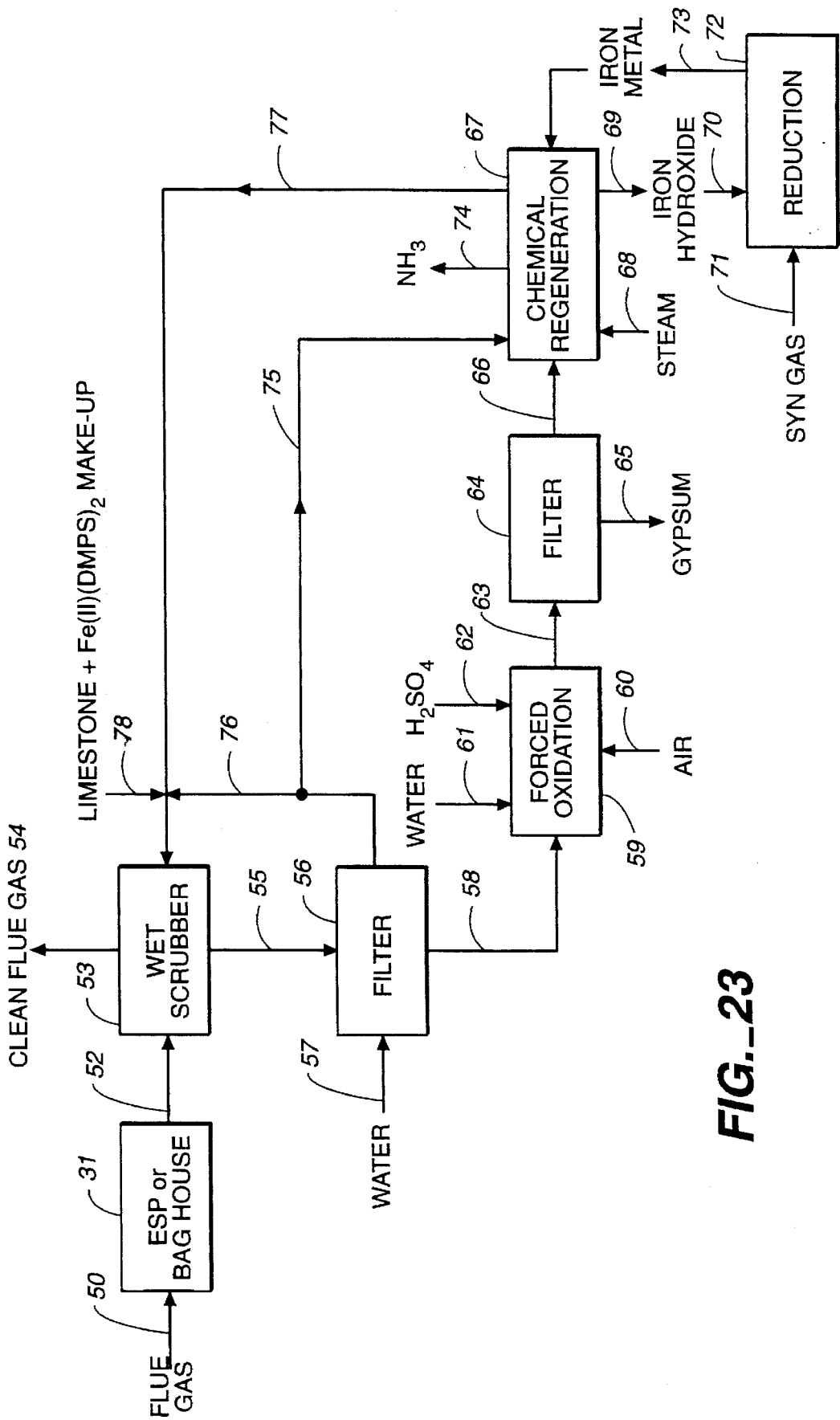

METAL REGENERATION OF IRON CHELATES IN NITRIC OXIDE SCRUBBING

ORIGIN OF THE INVENTION

The present invention was made, in part, under a Department of Energy Contract No. DE-AC-3076SF00098. The U.S. Government has specific rights in this invention.

BACKGROUND OF THE INVENTION

1. Field of The Invention

The present invention relates to an improved process for the removal of pollutants from a fluid. Specifically, the improved process relates to the contacting of a gas comprising $NO_x$ with an aqueous solution of a ferrous salt and ligand or chelate preferably having at least two mercapto groups. A metal powder or particles, such as iron powder, is used to reduce the complex reduce NO present and also $Fe(OH)_2$ and $Fe(OH)_3$. The ligand is also useful to remove hazardous metal ions from an aqueous solution.

Nitrogen oxides ($NO_x$), which includes nitric oxide (NO) and nitrogen dioxide ($NO_2$), in the atmosphere causes acid rain and urban smog. Acid rain stresses and kills forest, stunts crops, creates sterile lakes, and damages buildings, causing billions of dollars in harm to the environment. In addition, $NO_x$ contributes a characteristic brown hue to urban smog and induces the formation of PAN (peroxyacetylnitrite) and ozone. Itching eyes, coughing, chest pains and shortness of breath are the immediate health effects. Ozone may cause irreversible damage to the lungs and immune system. Ozone also causes serious injury to plant foliage.

2. Description Of Related Art

Anthropogenic $NO_x$ include those from stationary sources (fossil fuel power plants, municipal incinerators, smelters, nitric acid plants, nitration plants, chemical refineries, rotary kilns, etc.) and mobile sources (automobile, diesel cars, etc.). Several $NO_x$ control technologies have been developed. These include catalytic, adsorption, and reaction (oxidation or reduction) techniques. SCR (Selective Catalytic Reaction) is the most mature technique for stationary sources to achieve a high efficiency $NO_x$ control (greater than 80%). Catalysts are subject to poison by arsenic, alkaline materials, and particulates. The use of SCR requires the disposal of spent catalysts and the consumption of ammonia. Alternatively, Thermo-denox and $NO_x$-out processes inject ammonia and urea respectively into a boiler to reduce between 30 and 60% of $NO_x$. However, a fraction of $NO_x$ reduced is converted to $N_2O$, a greenhouse gas.

Each of the existing technologies for $NO_x$ control are subject to some drawbacks and difficulties, and there is much room for improvement. A technology which uses simple equipment, does not require the consumption of chemicals, and does not produce unwanted byproduct and/or catalyst wastes would be very desirable.

The use of metal chelates in wet scrubber systems for removal of NO from flue gas has been investigated for more than two decades. A number of metal chelates can bind NO to form nitrosyl metal complexes. The bound NO can later be converted to environmentally acceptable species. The metal chelates are then recycled. Therefore, metal chelates may be regarded as a catalyst in a wet scrubber system for the removal of NO from flue gas. This approach is very attractive because of its simplicity for integration into a wet desulfurization system. There may be not need for excessive new equipment and chemicals if an appropriate metal chelate is identified.

A well studied metal chelate is $Fe^{2+}$ ethylenediaminetetraacetic acid (EDTA); the chemistry of a wet scrubber system involving $Fe^{2+}$ (EDTA) has been examined in many laboratories. Several processes have been derived and tested at the pilot plant stages. these include for example, Asahi, Chisso, Kureha, Mitsui, Southern California such as arsenic, cadmium, chromium, mercury, and selenium, and are therefore unfit for discharge or disposal to the environment.

An efficient and cost-effective method for the removal of these toxic metal ions from scrubbing liquors and regeneration of agents is not presently available and is also needed.

Some general and specific references in this field include, for example:

R. R. Grinstead, U.S. Pat. No. 4,708,854, issued Nov. 24, 1987.

R. R. Grinstead, U.S. Pat. No. 4,859,437, issued Aug. 22, 1989.

S. G. Chang et al., U.S. Pat. No. 4,732,744, issued Mar. 22, 1988.

D. K. Liu et al., U.S. Pat. No. 4,810,474, issued Mar. 7, 1989.

S. G. Chang et al., U.S. Pat. No. 4,837,361, issued Jun. 6, 1989.

S. G. Chang et al., U.S. patent application Ser. No. 261,229, filed Oct. 21, 1988 and allowed.

S. G. Chang et al., U.S. Pat. No. 5,106,601, issued Apr. 21, 1992.

H. W. Blanch et al., U.S. Pat. No. 5,073,575, issued Dec. 17, 1991.

S. G. Chang et al., U.S. Pat. No. 5,108,723, issued Apr. 28, 1992.

S. G. Chang in U.S. Pat. No. 5,370,849, issued Dec. 6, 1994.

Meyzukova et al., (1971) *Farmakol. Toksikol. (Moscow)*, Vol. 34, No. 1, pp. 70–74. See *Chemical Abstracts*, 97223p (1972).

All of the patents, applications, articles, standards etc. cited in this application are incorporated by reference in their entirety. None of the art cited herein teaches or suggest the present invention.

METAL REDUCTION ON NO—The present invention discloses the use of metal particles as a reducing agent with a chelate metal ion (e.g. $Fe^{2+}$) to remove NO and optionally $SO_2$ (with pH control) from polluted gas, e.g., flue gas, and to remove toxic metal ions from scrubbing liquors.

Present flue gas desulfurization (FGD) scrubbers efficiently control $SO_2$ emissions, but are incapable of removing water-insoluble nitric oxide (NO). A modification of the existing FGD scrubbers to allow simultaneous removal of $NO_x$ is very desirable, eliminating the additional capital costs that are now required in a separate control scheme.

One approach see H. Hattori et al., "Practical Studies on the Removal of $NO_x$ by the Liquid Phase Absorption (Part 3)", *Kogai*, vol. 13, p. 35 (1978) involves the addition of iron (II) ethylenediaminetetraacetate (EDTA) in scrubbing liquor to promote the solubility of NO by forming the iron (II) (EDTA) (NO). The bound NO is then converted to $N_2O$ and nitrogen-sulfur compounds by reacting with sulfite/bisulfite ions (from the dissolution of $SO_2$). Subsequently, iron (II) (EDTA) is regenerated. One of many problems is the difficulty in the removal of the formed nitrogen-sulfur compounds from the scrubbing liquors, because of their high solubilities in water. Another problem is the ease of the oxidation of iron (II) (EDTA) by oxygen in flue gas to form iron (III) (EDTA), which complex is inactive in binding NO. Although the iron (III) (EDTA) is capable of being reduced by sulfite/bisulfite ions to regenerate iron (II) (EDTA), the regeneration rate is slow because of small rate constants and low concentrations of sulfite/bisulfite ions in scrubbing liquors. As a result, the concentration of the active iron (II) (EDTA) in solution is low, and thus the NO removal efficiency cannot be sustained and declines.

A new iron (II) compound for use in wet FGD scrubbers to control NO emissions is iron (II) (DMPS)$_2$, where DMPS is 2,3-dimercapto-1-propanesulfonate (HSCH$_2$CH(SH) CH$_2$SO$_3^-$). (see E. K. Pham, et al. "Removal of NO from Flue Gases by Absorption to an Iron (II) Thiochelate Complex and Subsequent Reduction to Ammonia" *Nature*, vol. 369, p. 139 (1994).) The use of this new chelate creates a different and simpler scrubber chemistry, compared to that using iron (II) (EDTA). The iron (II) (DMPS)$_2$ is more resistant to oxidation by oxygen than the conventional iron (II) (EDTA). Also, the DMPS maintains the iron in the active iron (II) oxidation state, resulting in a stable NO absorption efficiency. The iron (II) (DMPS)$_2$ also binds NO with a very large equilibrium constant, producing a very stable nitrosyl complex that does not react with sulfite or bisulfite ions. As a result, undesirable nitrogen-sulfur byproducts are not produced in the iron (II) (DMPS)$_2$ system, as they are using the iron (II) (EDTA) system. However, an improved reducing method is desirable.

SUMMARY OF THE INVENTION

The present invention relates to an improved process to regenerate iron (II) (CHELATE) by reduction of iron (II) (CHELATE) (NO) complex, which process comprises:

a) contacting an aqueous solution containing iron (II) (CHELATE) (NO) with metal particles at between about 20° and 90° C. to reduce NO present, produce ammonia or an ammonium ion, and produce free iron (II) (CHELATE) at a pH of between about 3 and 8.

The present invention also relates to a process for the removal of NO$_x$ from a gas containing NO$_x$ and optionally SO$_x$, which process comprises:

(a) contacting the gas containing NO$_x$ at autogenic pressure at a pH of between about 3 and 10 at a temperature between about 10° and 99° C. with an aqueous solution itself comprising:

(i) a water-soluble ferrous salt, (ii) an acid or alkali to assist in maintaining the pH at between about 3 and 10, (iii) and a ligand able to form a ferrous ion-chelate, which ligand is selected from a dimercapto containing compounds (DMC) or salts of structure I:

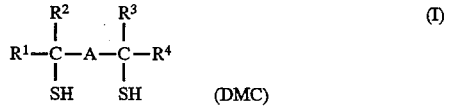

wherein A is independently selected from a direct bond or R$^5$—C—R$^6$ wherein R$^1$, R$^2$, R$^3$, R$^4$, R$^5$ and R$^6$ are each independently selected from hydrogen, sulfonate, sulfoxide, amine, carboxylic acid, carboxylic ester, carboxylic acid salt, hydroxyl, ether, aldehyde ketone, alkyl sulfonate, aryl sulfonate, hydroxyl amine, alkyl having 1 to 10 carbon atoms, substituted alkyl, aryl, substituted aryl, alkylenearyl, or alkylene substituted aryl, wherein the substitutions of the alkyl or aryl are each independently selected from one or more of the functional groups of mercapto, sulfonate, sulfoxide, amine, carboxylic acid, carboxylic ester, carboxylic acid salt, ether, aldehyde, ketone, alkyl sulfonate, aryl sulfonate, or hydroxyalkyl;

R$^1$ and R$^2$ together form >(C=O); or

R$^3$ and R$^4$ together form >(C=O), with the proviso that at least one of R$^1$, R$^2$, R$^3$, R$^4$, R$^5$ or R$^6$ contains a polar functional group so that the ferrous ion chelate or ferric ion chelate produced is water soluble;

(b) reducing by use of a reducing agent to regenerate Fe$^{+2}$ (DMC), and (c) optionally isolating and recycling the regenerated Fe$^{+2}$ (DMC) to step (a).

In another embodiment, the present invention also relates to a process for the removal NO from a fluid containing NO which process comprises:

(a) contacting the gas containing NO at autogenic pressure at a pH of between about 3 and 10 at a temperature between about 10° and 99° C. with an aqueous solution, itself comprising:

(i) A water-soluble ferrous salt, (ii) An acid or base to maintain the pH at between about 3 and 10, (iii) and a ligand able to form a ferrous ion-chelate, which ligand is selected from dimer-capto containing compounds (DMC') attached to the solid water-insoluble substrate:

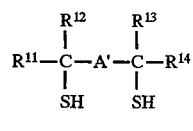

(DMC')

wherein A' is independently selected from a direct bond or R$^{15}$—C—R$^{16}$, wherein R$^{11}$, R$^{12}$, R$^{13}$, R$^{14}$, R$^{15}$ and R$^{16}$ are each independently selected from hydrogen, alkyl having 1 to 10 carbon atoms, substituted alkyl, aryl, substituted aryl, alkylenearyl, or alkylene substituted aryl, wherein the substitutions of the alkyl or aryl are each independently optionally selected from one or more of the functional groups of mercapto, sulfonate, sulfoxide, amine, carboxylic acid, carboxylic ester, carboxylic acid salt, ether, hydroxyl, aldehyde, ketone, alkyl sulfonate, aryl sulfonate, amine, carboxylic acid, or hydroxyalkyl;

R$^{11}$ and R$^{12}$ together form >(C=O), or

R$^{13}$ and R$^{14}$ together form >(C=O), with the proviso that at least one R$^{11}$, R$^{12}$, R$^{13}$, R$^{14}$, R$^{15}$, and R$^{16}$ contains a functional group so that the ligand can be covalently bonded to a said solid water insoluble substrate, (b) reducing by use of a metal particle reducing agent or by electro-reducing the aqueous solution of step (a) containing Fe$^{2+}$ (DMC') NO in the presence of acid or base to maintain the pH between about 3 and 10 at between about 0.2 to 20 volts at between about 0.1 and 20 amps to produce Fe (DMC'), and (c) optionally isolating and recycling the regenerated Fe$^{2+}$ (DMC') to step (a).

In another embodiment of the present invention, the process for the removal of toxic metal ions from an aqueous solution, which process comprises:

(a) contacting a ligand (DMC') of the structure:

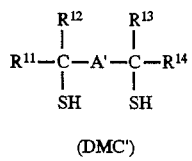

(DMC')

wherein A' is independently selected from a direct bond or

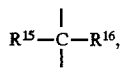

$R^{11}$, $R^{12}$, $R^{13}$, $R^{14}$, $R^{15}$ and $R^{16}$ are each independently selected from hydrogen, alkyl having 1 to 10 carbon atoms, substituted alkyl, aryl, substituted aryl, alkylenearyl, or alkylene substituted aryl, wherein the substitutions of the alkyl or aryl are each independently optionally selected from one or more of the functional groups of mercapto, sulfonate, sulfoxide, amine, carboxylic acid, carboxylic ester, carboxylic acid salt, hydroxyl, ether, aldehyde, ketone, alkyl sulfonate, aryl sulfonate, amine, carboxylic acid, or hydroxyl alkyl;

$R^{11}$ and $R^{12}$ together form $>(C=O)$, or $R^{13}$ and $R^{14}$ together form $>(C=O)$, with the proviso that at least one $R^{11}$, $R^{12}$, $R^{13}$, $R^{14}$, $R^{15}$ and $R^{16}$ contains a functional group so that the ligand can be covalently bonded to a solid water insoluble substrate, with an aqueous solution of toxic metal ions at a pH of 3 to 10, at a temperature of +10° to 95° C. for 0.01 to 2 hr; and (b) separating the metal ion-chelate complex from the metal ion reduced aqueous solution.

BRIEF DESCRIPTION OF THE FIGURES

FIG. 1 shows a schematic representation of the equipment for a conventional gas contact process of the art.

FIG. 2 shows a schematic representation of the equipment for a conventional spray tower gas contact process of the art.

FIG. 3 shows a schematic representation of an electrochemical cell showing scrubber solution and counter ion solution.

FIG. 4A shows a graphic representation of the $P_{NO}$ absorption curve of a $Fe^{2+}$ (DMPS) solution under anaerobic conditions as a function of time.

FIG. 4B shows a graphic representation of the $P_{NO}$ absorption curve of a $Fe^{2+}$ (DMPS) solution under the anaerobic conditions of FIG. 4A now modified by the presence of 5% oxygen.

FIG. 5A shows a graphic representation of the $P_{NO}$ absorption curve of a $Fe^{2+}$ (EDTA) solution under anaerobic conditions as a function of time.

FIG. 5B shows a graphic representation of the $P_{NO}$ absorption curve of a $Fe^{2+}$ (EDTA) solution under the anaerobic conditions of FIG. 5A now modified by the presence of 5% oxygen.

FIG. 6 is a graphic representation of the stoichiometric ratio $Fe^{2+}/NO$ for DMPS as a function of $Fe^{2+}$ ion concentration.

FIG. 7 is a graphic representation of the stoichiometric ratio Fe2+/NO for EDTA as a function of the $Fe^{2+}$ ion concentration.

FIG. 8 is a graphic representation of the stoichiometric ratio $Fe^{2+}/NO$ for DMPS as a function of pH having 5% oxygen present.

FIG. 9A shows a graphic representation of the $P_{NO}$ absorption curve for a $Fe^{2+}$ (EDTA) solution under anaerobic conditions as a function of time.

FIG. 9B shows a graphic representation of the $P_{NO}$ absorption curve for a $Fe^{2+}$ (EDTA) solution under the anaerobic conditions now modified by the presence of $HSO_3/SO_3^{2-}$.

FIG. 10A shows a graphic representation of a $P_{NO}$ absorption curve for a $Fe^{2+}$ (DMPS) solution under anaerobic conditions as a function of time.

FIG. 10B shows a graphic representation of the $P_{NO}$ absorption curve for a Fe (DMPS) solution under anaerobic conditions of FIG. 10A now modified by having $HSO_3/SO_3^{2-}$ ion present.

FIG. 10C is a blank experiment for FIGS. 10A and 10B.

FIG. 11A is a graphic representation of a $P_{NO}$ absorption curve for a $Fe^{2+}$ (DMPS) solution under anaerobic conditions as a function of time.

FIG. 11B is a graphic representation of a $P_{NO}$ absorption curve under anaerobic conditions as a function of time with re adsorption of NO.

FIG. 12A is a graphic representation of the $P_{NO}$ curve for a $Fe^{2+}$ (DMAS) solution under anaerobic conditions as a function of time under electroreduction cycle conditions.

FIG. 12B is a cycle graphic representation of FIG. 12A after the first electroreduction cycle.

FIG. 12C is a graphic representation of FIG. 12A after seven electroreduction cycles.

FIG. 13 is a graphic representation of the percentage recovery of Fe(II) DMPS as a function of electroreduction time in hr.

FIG. 14 compares the absorption efficiencies of NO by solutions containing $Fe^{2+}$ (EDTA) under similar experimental conditions.

FIG. 15 is a graphic representation of the $P_{NO}$ of several concentrations of $Fe^{2+}$ (L) as a function of the volumetric ratio (L/G) of scrubbing liquor to flue gas.

FIG. 16 is a schematic representation of a bench-scale experimental system to remove NO from gas.

FIG. 17 is a graphic representation of the effect of L/G on NO removal efficiency.

FIG. 18 is a graphic representation of the NO removal efficiency versus inlet NO concentration.

FIG. 19 is a graphic representation of the effect of iron (II) $(DMPS)_2$ concentration of NO removal efficiency.

FIG. 20 is a graphic representation of NO removal efficiency versus absorption time showing the regeneration.

FIG. 21 is a schematic representation of an integrated bench scale experimental system showing sludge and solids removal.

FIG. 22 is a graphic representation of the removal of NO reduced to ammonia versus the reduction of iron (II) (EDTA) NO by iron metal.

FIG. 23 is a schematic representation of a conceptional flow diagram of an integrated limestone/iron (DMPS) system for combined removal of $SO_2$ and $NO_x$ from flue gas.

Definitions

As used herein:

"Chelate" refers to any chelate which is useful to coordinate with iron which has been shown to be effective in reducing NO or $SO_2$.

"Metal particles" refers to the size and shape of the active reducing metal. Particle includes irregular chunks, beads, spheres, chips, powders, and the like that would fit within a 1 inch sphere as an upper limit and down to about 50 microns as a lower limit. Preferably, the upper limit size is equivalent to 0.5 in sphere.

"Metal" refers to the metal used as a reducing agent for NO, etc. and includes for example, iron, tin, zinc and the like. Iron is preferred. Combinations of metal particles are also used.

DETAILED DESCRIPTION OF THE INVENTION AND PREFERRED EMBODIMENTS

Ferrous ions possess excellent properties for NO removal after forming coordination compounds with organic chelates which feature a moiety of two mercapto (thiol) groups either bonded to two adjacent carbons (see Formula 1 below) or bonded to two carbons, one of which is one carbon removed from the other (See Formula 2 below). In addition, the chelates should contain at least one functional group, preferably a sulfonate group, that polarizes the molecule for application in a water soluble system. The polar structure ensures the high solubility of the complexes after the coordination with ferrous ions and the absorption of NO.

$R^1 — CR^2 (SH) — CR^3 (SH) — R^4$   Formula 1
$R^1 — CR^2 (SH) — CR^5 (R^6) — CR^3 (SH) — R^4$   Formula 2 wherein each $R^1$, $R^2$, $R^3$, $R^4$, $R^5$, or $R^6$ is independently a hydrogen; an alkyl group; an aryl group; a sulfonate group; an amine group; a carboxylic acid group; a hydroxyl group; an aldehyde group; a ketone group; a hydroxyalkyl group; an alkyl or an aryl group containing mercapto, sulfonate, sulfoxide, amine, carboxylic ester, carboxylic acid or salt, ether, aldehyde, or ketone groups; wherein at least one $R^1$, $R^2$, $R^3$, $R^4$, $R^5$, or $R^6$ is a functional group that can polarize the chelates for application in a soluble system.

Examples of the "Formula 1" compounds include:

2,3-dimercapto-1-propanesulfonate (DMPS) (HSCH$_2$CH (SH) CH$_2$SO$_3^-$);

2, 3-dimercapto-1, 4-butanedisulfonate (DMBDS) ($^-$O$_3$SCH$_2$—CH(SH)CH(SH) CH$_2$SO$_3^-$);

1, 2-dimercapto-3, 4-butanedisulfonate (1, 2-DMBS) [HSCH$_2$CH (SH) CH (SO$_3^-$) CH$_2$SO$_3^-$];

p-1, 2-dimercapto-ethyl-benzenesulfonate (DEBS) (HSCH$_2$CH (SH) C$_6$H$_4$SO$_3^-$);

p- (dimeroaptropropoxy) benzenesulfonate (DMPBS) (p-HSCH$_2$CH (SH) CH$_2$OC$_6$H$_4$SO$_3^-$);

2,3-dimercapto-1,4-butanediol (DMBDO) (HOCH$_2$CH(SH) CH (SH) CH$_2$OH); or dithiooxalate (DTO) OC (SH) C=O (SH). Examples of the "Formula 2" compound include 1, 3-dimercapto-2-propanesulfonate (1,3-DMPS) (HSCH$_2$)$_2$CHSO$_3^-$.

These sulfonate groups not only ensure the high water solubility of the complexes, but also decrease the volatility of the compounds.

In different applications, ferrous chelates may be localized (adsorbed, covalently bonded, etc.) onto solid surfaces for the absorption of NO. Under such circumstances, the dimercapto group structure may be bonded (or adsorbed upon) to a solid, such as an organic compound, a polymer, a membrane, or a resin. It is not necessary for the polar groups to be a part of the solid structure under this situation. However, the condition that at least two mercapto groups of the chelates are separated by either two carbons (Formula 1) or three carbons (Formula 2) still must be satisfied. Chelates featuring a moiety of two or more mercapto (thio) groups located two or three carbons away, including the soluble as well as the insoluble cases, are termed Dimercapto Chelates (DMC) in the following discussions herein.

The dimercapto-containing compounds when coordinated with a metal ion, preferably a ferrous ion form Fe$^{2+}$ (DMC) thelate. These chelates are very effective for the absorption of NO from flue gas. The resulting Fe$^{2+}$ (DMC) NO is converted back to Fe$^{2+}$ (DMC) for recycling by either an electroreduction and/or a chemical reaction method. The bound NO is reduced to N$_2$O, N$_2$, NH$_3^+$OH, and/or NH$_4^+$ in cases where the electroreduction method is used. The N$_2$O and N$_2$ evolved from the electroreduction cell may be cycled back to a boiler or a combustion source with a stream of purge steam and/or gas. This step prevents N$_2$O, a greenhouse gas, from being released to the atmosphere. The NH$_3^+$OH and NH$_4^+$ may be separated from the scrubbing liquors by a conventional separation method. In the case where a chemical reaction method is used, the bound NO is reduced by a compound containing a thiol group, such as cysteinamine to a mixture of N2 and N2O which gases may be treated by the methods described above. The oxidized form of thio-containing compounds is readily reduced to the original form by an electroreduction method. Thus, both Fe$^{2+}$ (DMC) and thio-containing compounds can be regenerated by the electroreduction method.

Flue gas normally contains 1 to 10 volume % O$_2$, which can oxidize ferrous ion to inactive ferric ion. DMC effectively reduces ferric to ferrous ion, while DMC is converted to the oxidized form (containing an —S—S— linkage). The oxidized form of DMC may be reduced to the original form of DMC by the electroreduction method. The oxidized form of DMC does not coordinate ferric and ferrous ions effectively. In order to prevent ferric and/or ferrous ions from precipitating as hydroxide or oxide salts in cases wherein all DMC is oxidized, a secondary chelating compound, such as a sodium citrate, having a weaker stability constant than the corresponding DMC toward ferrous ion, may be added in the scrubber solution. This addition keeps ferric and/or ferrous ions soluble by forming complexes with them until the DMC is regenerated.

In addition, a three-phase heterogeneous system for the cleanup of NO from flue gas may be developed. The aforementioned dimercapto groups may be synthesized (or covalently bonded) onto a solid surface, such as a polymer, a resin, or a membrane or tightly bound to the surface of a solid support. These solid substrates may be immersed in a solution or deposited with a thin surface layer of an aqueous film After the coordination of a ferrous ion on the dimercapto groups, the solid materials are expected to absorb NO from a gas stream. Subsequent steps in the disposal of the bound NO and the regeneration of active sites may be achieved as described in a homogeneous soluble system.

A Fe$^{2+}$ (DMC) chelate may be used as an additive in wet desulfurization scrubbers for combined removal of SO$_2$ and NO$_x$ from flue gas. The wet desulfurization scrubbers use alkaline materials including limestone, lime, thiosorbic lime, magnesium carbonate and oxide, dolomite, soda ash, caustic soda, sodium sulfite, and amines. The alkaline solution is responsible for the removal of SO$_2$ and NO$_2$, while Fe$^{2+}$ (DMC) is responsible for the absorption of NO. The treatment of the absorbed NO and the regeneration of Fe$^{2+}$ (DMC) for recycling are similar to those described above.

The application of the dimercapto compounds for the abatement of NO$_x$ and SO$_2$ is extended. A molecule consisting of both of the aforementioned dimercapto moiety and an amine moiety is synthesized for combined removal of NO$_x$ and SO$_2$ from flue gas. The amine moiety is composed of at least one primary, secondary, and/or tertiary amine group. The amine moiety may be in the form of a salt or a functional group having Pka of 4–7.5. The amine moiety plays a role in absorbing $SO_2$ and forming an amine bisulfite salt. The amine bisulfite salt formation is a reversible reaction. Therefore, the amine moiety can be thermally regenerated to remove the $SO_2$. A stream of high concentration $SO_2$ is produced. The $SO_2$ is converted to elemental sulfur or sulfuric acid using a conventional commercial process. On the other hand, the dimercapto moiety in the molecules plays the role of absorbing NO after coordination with ferrous ions as described.

Toxic Metal Ion Coordination

Moreover, the dimercapto compounds are used to remove toxic metal ions from scrubbing liquors through the coordination process. These metal ions include, for example, arsenic, cadmium, chromium, mercury, selenium, etc. The stability constants of dimercapto compounds (DMC) with metal ions are very large. Consequently, the removal efficiency is very high. Again, the dimercapto moiety may be contained (absorbed, covalently bonded to) in a solid, such as a polymer, a resin, or a membrane. The separation of the solid dimercapto compounds saturated with metal ions from scrubbing liquors may be done by a conventional liquid-solid separation technique, such as precipitation, filtration, etc. The dimercapto containing adsorbent is regenerated by an ion-exchange method.

Dimercapto Compound Attached to a Solid Substrate

The dimercapto moiety attached to a solid substrate DMC of the present invention also includes those DMC structures wherein the polar functional group is not present and the DMC is covalently bonded (or occluded to, adsorbed upon) a substrate which is water insoluble. Further, the combination of the DMC-solid substrate is also water insoluble.

It is possible to obtain these water insoluble macromolecules by attaching the dimercapto group to a particle or article of polystyrene (or a polystyrene derivative as is described by H. Blanch et ah, U.S. Pat. No. 5,073,575. The other coupling reactions described in Blanch et ah are also utilized.

Similarly to produce water insoluble DMC moieties it is possible to adapt the preparations of R. R. Grinstead of U.S. Pat. Nos. 4,859,437 or 4,708,854.

The water insoluble DMC moiety is a covalently bonded macromolecule.

Further it is possible to adapt the coupling reactions described by M. Goodman, et al., in U.S. Pat. No. 4,687,873, wherein the DMC is covalently bonded to a macromolecule through a linking group.

General Synthesis Of Some DMC Compounds 2, 3-DMBDS (a) A 1, 4-Dibromo-2-butene is added to an aqueous solution of sodium sulfite. This mixture is stirred at between about 40° to 90° C., preferably about 60° C., until the organic phase disappears and a clear aqueous solution is obtained. This solution is evaporated to obtain a solid mixture of 2-butene-1, 4-disulfonate and sodium bromide.

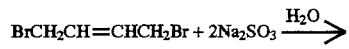

$NaSO_3—CH_2CH=CHCH_2SO_3Na + 2NaBr$ (b) Dibromodisulfonate —Acetic acid is added to the solid mixture to dissolve the 2-butene-1, 4-disulfonate. Subsequently, bromine is added dropwise to the solution at between about 0° to 30° C. to produce 2, 3-dibromo-1, 4-butane disulfonate.

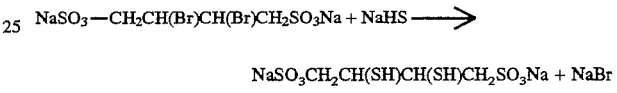

$NaSO_3—CH_2CH(Br)CH(Br)CH_2SO_3Na$

The solution is concentrated under reduced pressure. Ether is added to the solution to precipitate the dibromide product, which sometimes contains a trace amount of NaBr. The dibromide product is purified by recrystallization using isopropanol.

(c) Dithiodisulfonate—Sodium hydrogen sulfide is added to an aqueous solution of 2, 3-dibromo-1, 4-butane disulfonate in a reaction flask. The aqueous mixture is stirred and undergoes reaction to produce crude 2, 3-DMBDS.

$NaSO_3—CH_2CH(Br)CH(Br)CH_2SO_3Na + NaHS \longrightarrow$ $NaSO_3CH_2CH(SH)CH(SH)CH_2SO_3Na + NaBr$ The crude 2, 3-DMBDS is purified with the following sequential steps: 1 the excess NaHS is removed by acidification of the solution with hydrochloric acid to evolve $H_2S$. The solution is continuously bubbled with carbon dioxide to strip the remaining hydrogen sulfide from the solution. 2 Lead acetate is added to precipitate the complexes of lead 2, 3-DMBDS, which is separated from the solution. 3 The 2, 3-DMBDS is dissolved in a concentrated sulfuric acid (20%) aqueous solution. 4 Vacuum evaporization to obtain the sodium salt of 2, 3-MBDS, after the neutralization of the solution by $Na_2CO_3$, and 5 extraction of 2, 3-DMBDS with alcohol, followed by recrystallisation from alcohol to obtain the disodium salt of 2, 3-DMBDS.

1,2-DMBDS

The synthesis procedure for 1, 2-DMBDS is similar to 2, 3-DMBDS.

(a) 3, 4-Dichloro-1-butene is added to an aqueous solution of sodium sulfite at about 40° to 70° C. to produce 1-butene-3, 4-disulfonate.

$ClCH_2CH(Cl)CH=CH_2 + 2Na_2SO_3 \xrightarrow{H_2O}$ $(NaSO_3)CH_2CH(SO_3Na)CH=CH_2 + 2NaCl$ (b) Bromine is slowly added dropwise to an acetic acid solution of 1-butene-3, 4-disulfonate at between about ambient temperature to produce 1, 2-dibromobutane-3, 4-disulfonate.

$(NaSO_3)CH_2CH(SO_3Na)CH=CH_2 + Br_2 \xrightarrow{CH_3COOH}$ $(NaSO_3CH_2CH(SO_3Na)CH(Br)CH_2Br$ (c) Sodium hydrogen sulfide is contacted with an aqueous solution of 1, 2-dibromobutane-3, 4-disulfonate at about ambient temperature to form 1, 2-DMBDS.

$(NaSO_3)CH_2CH(SO_3Na)CH(Br)CH_2Br+NaHS$ $(NaSO_3)CH_2CH(SO_3Na)CH(SH)CH_2(SH)+NaBr$

The purification of 1, 2-DMBDS was performed according to those described above for 2, 3-DMBDS.

Other DMC are prepared by adapting this synthesis route.

Results And Discussions

The NO absorption capacity of several ferrous dimercapto chelates studies is larger than that of $Fe^{2+}$ (EDTA) under the same experimental conditions. FIG. 4A shows the NO absorption curve of a $Fe^{2+}$ (DMPS) solution under anaerobic conditions. 10 mM $Fe^{2+}$ (DMPS) absorbs 7.5 mM of NO from a simulated flue gas containing 580 ppm NO at 55° C. and pH of 6.6. This corresponds to an equilibrium constant of more than $1.5 \times 10^7$ $M^{-1}$. In the presence of 5% oxygen, the amount of NO absorbed decreases to 3.3 mM (FIG. 4B), a 56% reduction from the anaerobic condition. For a comparison, FIG. 5A shows that 10 mM $Fe^{2+}$ (EDTA) absorbs 2.6 mM of NO from a flue gas containing 575 ppm NO at 55° C. and pH of 5.9 under anaerobic conditions. This corresponds to an equilibrium constant of $1.0 \times 10^6$ $M^{-1}$. In the presence of 5% oxygen, the amount of NO absorption decreases to only 0.44 mM (FIG. 5B), an 83% reduction from the anaerobic conditions. Therefore, $Fe^{2+}$ (DMPS) absorbs more than 2.5 times NO than $Fe^{2+}$ (EDTA) under anaerobic conditions, and 7.5 times more NO in the presence of 5% oxygen. A stoichiometric ratio, $Fe^{2+}/NO$ (the molar ratio of $Fe^{2+}$ to NO absorbed) is used to measure the effectiveness of metal chelate utilization. The smaller the stoichiometric ratio, the more effective the metal chelate. FIGS. 6 and 7 show this stoichiometric ratio as a function of ferrous concentration, for $Fe^{2+}$ (DMPS) and $Fe^{2+}$ (EDTA) respectively, under simulated flue gas conditions (PNO about 550 ppm oxygen, oxygen=5%, and pH is 5.5 to 6). The results indicate that $Fe^{2+}$ (DMPS) becomes even more effective than $Fe^{2+}$ (EDTA) in NO absorption in the presence of oxygen with an increase in the concentration of ferrous chelates. The absorption capacity of $Fe^{2+}$ (DMPS) is more than 10 times that of $Fe^{2+}$ (EDTA) at $[Fe^{2+}]=50$ mM.

The pH dependence on the NO absorption by $Fe^{2+}$ (DMC) solutions was examined. Under anaerobic conditions, the NO absorption capacity of an $Fe^{2+}$ (DMPS) solution remains the same in the pH range (4 to 9) studied. In the presence of 5% oxygen, the NO absorption capacity improves slightly as the pH of solutions decrease from 9 to 4. This is attributed to slower oxidation rate of ferrous ions by oxygen at low pH conditions. FIG. 8 shows that in the presence of 5% oxygen in a gas mixture containing 529 ppm NO and when 4 times as much [DMPS] as [ferrous ions] was used in a solution, the molar ration of $[Fe^{2+}]$ to [NO] absorbed $n_{FE(11)}/n_{NO}$, decreases from 2.75 to 1.5 with decreases of pH from 8.75 to 4.25.

The oxygen in a flue gas may oxidize ferrous to ferric ions, which are then inactive in NO absorption. Surprisingly, DMC effectively reduces the ferric back to ferrous ions. Table 1 below shows that the addition of DMPS to a ferric sulfate solution can make the solution effective for No absorption. This is attributed to the ability of DMPS to reduce ferric ions to ferrous ions. The oxidized form of DMPS is readily converted to the original DMPS form by an electroreduction method.

TABLE 1

The use of a ferric solution for the absorption of NO at 55° C.

| $P^iNO$ ppm | $O_2$ % | pH | $[Fe^{3+}]$ mM | [DMPS] mM | [DMPS]/ $[Fe^{3+}]$ | $[NO]_{abs}$ mM | $[Fe^{3+}]/[NO]$ |
|---|---|---|---|---|---|---|---|
| 525 | 0 | 5.5 | 5 | 20 | 4 | 4.54 | 1.10 |
| 480 | 0 | 5.9 | 5 | 10 | 2 | 2.43 | 2.06 |
| 630 | 4.3 | 4.9 | 5 | 20 | 4 | 2.27 | 2.20 |
| 500 | 5 | 5.8 | 5 | 20 | 4 | 1.95 | 2.56 |
| 530 | 5.4 | 5.6 | 10 | 40 | 4 | 3.87 | 2.58 |

The fate of NO after absorption is a major environmental concern. The bound NO in nitrosyl ferrous chelates must be removed to regenerate ferrous chelates for recycling. In the case of an EDTA system, the bound NO is removed from $Fe^{2+}$ (EDTA) NO by reaction with $HSO_3^-/SO_3^{2-}$. However, various nitrogen-sulfur compounds are produced as a result. FIG. 9A shows that 10 mM $Fe^{2+}$ (EDTA) reached equilibrium with a gas mixture containing 575 ppm NO to produce 2.35 mM $Fe^{2+}$ (EDTA) NO at 55° C. and pH of 5.8. The solution was saturated with NO. However, after the solution was allowed to react with 20 mM $HSO_3^{2-}$ at 55° C. for 5 min, it resumed absorption of NO as shown in FIG. 9B. This result is due to the reaction of $HSO_3^-/SO_3^{2-}$ with the bound NO to regenerate $Fe^{2+}$ (EDTA). However, the nitrogen-sulfur compounds were produced as a result. These nitrogen-sulfur compounds include hydroxylamine disulfonate, hydroxylamine monosulfonate, amine trisulfonate, amine disulfonate, and sulfonate. All of these compounds are very soluble in water, which makes their disposal difficult. Methods for separation of these compounds from scrubbing liquors include precipitation as potassium salts (Asahi Chemical's process) and hydrolysis under acid-catalyzed conditions to form ammonium bisulfite (MHI process). Both of these methods are cumbersome and expensive. The complications associated with the disposal of these nitrogen-sulfur compounds increases the overall economics of the technology and retards its commercialization prospects for flue gas cleaning.

On the contrary, the present invention demonstrates that the bound NO in $Fe^{2+}$ (DMC) NO is much less reactive with $HSO_3^-/SO_3^{2-}$. Therefore, the formation of nitrogen-sulfur compound is largely prevented. FIG. 10A shows that 4 mM $Fe^{2+}$ (DMPS) NO was produced after exposure of 5 mM $Fe^{2+}$ (DMPS) with a gas mixture containing 480 ppm NO. Then, after the 4 mM Fe (DMPS) NO was allowed to react with 10 mM $HSO_3^-/SO_3^{2-}$ at 55° C. for 10 min, the solutions did not resume the absorption of detectable amounts of NO when treated with a NO containing gas mixture (FIG. 10B). FIG. 10C shows the result of a blank experiment, a seemingly small absorption area that can be attributed to the entrance of room air (free of NO) into the system during the process of $HSO_3^-/SO_3^{2-}$ addition.

Nevertheless, the bound NO should be removable from the $Fe^{2+}$ (DMC) NO in order to regenerate $Fe^{2+}$ (DMC) for recycling. The present invention shows that the bound NO in $Fe^{2+}$ (DMC) NO reacts with a thiol compound. FIG. 11A shows that 3.4 mM of $Fe^{2+}$ (DMPS) NO was produced after the saturation of a 5 mM $Fe^{2+}$ (DMPS) solution with a gas mixture containing 490 ppm NO at 55° C. and pH of 5.7. Subsequently, the solution was allowed to react with 10 mM cysteamine at 55° C. for 5 min, followed by bubbling the aforementioned NO containing gas mixture through the solution. The solution reabsorbs NO (FIG. 11 B) which indicates removal of NO from the complexes and the regeneration of $Fe^{2+}$ (DMPS). The degree of regeneration is increased along with an increase of reaction time and temperature and/or the concentration of cysteamine.

Another method of regeneration of $Fe^{2+}$ (DMC) from $Fe^{2+}$ (DMC) NO involves the electroreduction of the bound NO. The present invention shows that the process of NO absorption by $Fe^{2+}$ (DMC) solutions in the presence of oxygen can be repeated several days using an electroreduction method to regenerate the scrubbing solutions. When an NO saturated and oxygen oxidized Fe (DMPS) solution (FIG. 12A) was electroreduced at an applied voltage of 10 V and a current of 0.1 to 0.5 Amp for a period of 2 hr, the recycled scrubber solution exhibited a recovery of NO absorption ability. FIGS. 12B and 12C show the absorption profiles obtained from the regeneration of the scrubbing liquors by electroreduction after the first and seventh cycles, respectively. These results show a consistent regeneration of 27% under the conditions employed. The time-dependence regeneration of scrubbing liquors by the electroreduction method was investigated. An aqueous solution containing 50 mM $Fe^{2+}$ (DMPS) was exposed to a gas mixture of 570 ppm NO, 5% oxygen, and the balance nitrogen at 55° C. The spent liquors were regenerated repeatedly by the electroreduction method at 90° C. as a function of time. As illustrated in FIG. 13, the regeneration of the active catalyst $Fe^{2+}$ (DMPS) increases with electroreduction time, with nearly 60% of the scrubbing liquor regenerated after an overnight electrolysis of 17 hr. The NO electroreduction process remains to be optimized. This may be achieved by increasing the surface areas of electrodes, by using better electrode materials, and by conducting the electrolysis at elevated temperatures in order to increase the current density at a given voltage.

The kinetics of NO absorption by several $Fe^{2+}$ (DMC) solutions are comparable to that by $Fe^{2+}$ (EDTA). FIG. 14 compares the absorption efficiencies of NO by solutions containing $Fe^{2+}$ (EDTA) with three different $Fe^{2+}$ (DMC) moieties, e.g., $Fe^{2+}$ (DMBDO), $Fe^{2+}$ (DMPS), and $Fe^{2+}$ (DMBDS) under very similar experimental conditions. The experiments were carried out using a bench-scale spray tower scrubber. The NO removal efficiency of $Fe^{2+}$ (EDTA) was about 60% in the beginning, but rapidly decreased to between 25 and 30% at the steady state, while the NO removal efficiency ranged between 30 and 55% depending on the $Fe^{2+}$ (DMC) used. The NO absorption rate follows the order: $Fe^{2+}$ (DMBDS) >$Fe^{2+}$ (DMPS) >$Fe^{2+}$ (DMBDO). The NO removal efficiency in $Fe^{2+}$ (DMC) systems were not sensitive to the presence of $HSO_3^-/SO_3^{2-}$ in the solutions, and did not decay with time as rapidly as in the $Fe^{2+}$ (EDTA) system. The NO removal efficiency may be improved by increasing the concentration of ferrous chelates in solutions and/or by increasing gas-liquid contacts.

In principle, increasing the gas/liquid contact improves the removal efficiency of NO. However, there is a limit to the NO removal efficiency achievable based on thermodynamic considerations. FIG. 15 shows that this limit depends on the concentration of metal chelate in solutions, NO absorption equilibrium constants, and the volumetric ratio (L/G) of scrubbing liquor to flue gas. For example, if a flue gas containing 600 ppm NO is scrubbed with a solution containing 25 mM of active $Fe^{2+}$ (EDTA) and at a L/G (gallons/ 1000 cu-ft) of 25, the best achievable final NO concentration is 150 ppm, i.e., a 75% NO removal efficiency, since the equilibrium constant of NO with $Fe^{2+}$ (EDTA) is about $1\times10^6 M^{-1}$ at 55° C. However, the NO removal efficiency can reach 96% under identical conditions as described above if $Fe^{2+}$ (DMPS) is employed, because the equilibrium constant of NO with $Fe^{2+}$ (DMPS) is $1.5\times10^6 M^{-1}$ at 55° C.

In summary, an aqueous mixture of a ferrous salt, a base or acid, a dimercapto compound mentioned above, and a secondary chelating compound, such as a citrate salt, is formulated for an effective removal of NO individually or simultaneously with $NO_2$ and $SO_2$ from polluted gas, e.g., flue gas. The above formulation may include a reductant such as a thiol compound or $S_2O_4^{2-}$ when a chemical reaction method is chosen for regeneration of $Fe^{2+}$ (DMC) from $Fe^{2+}$ (DMC) NO. The combination of a chemical reaction method for regenerating $Fe^{2+}$ (DMC) from $Fe^{2+}$ (DMC) NO, and an electroreduction method for regenerating DMC from their oxidized form (containing —S—S—) is a cost-effective route. The absorbed NO is converted to $N_2$, $N_2O$, $NH_3$+OH, and/or $NH_4^+$ or to $N_2$ and $N_2O$ depending on the regeneration method employed. $N_2O$ is thermo-decomposed by cycling it to a combustion source.

Process Applications

Several applications are derived from the use of the aforementioned dimercapto containing compounds to cleanup flue gas pollutants either individually or simultaneously. These pollutants include NO, $SO_2$, or toxic metal ions such as arsenic (As), mercury (Hg), cadmium (Cd), chromium (Cr), or selenium (Se). A few of these applications are described as follows:

Cleanup Of NO

The dimercapto containing compounds of the present invention, when coordinated with a metal ion especially a ferrous ion, e.g., forming $Fe^{2+}$ (DMC) are very effective for absorption of NO from flue gas as described above. The resulting $Fe^{2+}$ (DMC) NO is converted back to $Fe^{2+}$ (DMC) for recycling by either an electroreduction and/or a chemical reaction method. The bound NO is reduced to $N_2O$, nitrogen, $NH_3$+OH/$NH_3$, and/or $NH_4^+$ in cases where the electroreduction method is used. The $N_2O$ and nitrogen evolved from the electroreduction cell is cycled back to a boiler or a combustion source with a stream of purge steam and/or gas. This step revents $N_2O$, a greenhouse gas, from being released to the atmosphere. The $NH_3^+OH$ and $NH_4^+$ can be separated from the scrubbing liquors by a conventional separation method. In the case when a chemical reaction method is used, the bound NO is reduced by a reducing agent such as a compound containing a thiol group, for example cysteamine, to nitrogen and/or $N_2O$, which are treated by the method described above. The oxidized form of thiol-containing compounds is readily reduced to the original form by electroreduction method. Thus, both $Fe^{2+}$ (DMC) and thio-containing compounds are regenerated by the electroreduction method. Other reducing agents, such as $S_2O_4^{2-}$ are also feasible for the regeneration of $Fe^{2+}$ (DMC) from $Fe^{2+}$ (DMC) NO.

Flue gas normally contains 1 to 10% $O_2$, which oxidizes ferrous to inactive ferric ions. DMC effectively reduces ferric to ferrous ions, while DMC is converted to the oxidized form (containing a —S—S— linkage) as discussed. The oxidized form of DMC is reduced to the original form of DMC by the electroreduction method. The oxidized form of DMC does not coordinate ferric and ferrous ions effectively. In order to prevent ferric and/or ferrous ions from precipitation as hydroxide or oxide salts under the conditions when most of the DMC is oxidized, a secondary chelating compound, such as a sodium citrate, with a weaker stability constant than the corresponding DMC toward ferrous ion, may be added in the scrubber solution to keep ferric and/or ferrous ions soluble by forming complexes with them during the regeneration of DMC.

In addition, a three-phase heterogeneous system for the cleanup of NO from flue gas may be developed. The again dimercapto groups may be synthesized (adsorbed, covalently bonded, etc.,) onto a solid surface, such as a polymer, a resin, or a membrane. These substrates may be immersed in a solution or deposited with a then surface layer of an aqueous film. After the coordination of a ferrous ion on the dimercapto groups, the solid materials are expected to absorb NO from a gas stream. Subsequent steps in the disposal of the bound NO and the regeneration of active sites may be achieved as described in a soluble system.

Simultaneous Cleanup Of $NO_x$ And $SO_2$

An $Fe^{2+}$ (DMC) may be used as an additive in wet desulfurization scrubbers for combined removal of $SO_2$ and $NO_x$ from flue gas. The wet desulfurization scrubbers use alkaline materials including limestone, lime, thieosorbic lime, magnesium carbonate and oxide, dolomite, soda ash, caustic soda, sodium sulfite, and amines. The alkaline solution is responsible for the removal of $SO_2$ and $NO_2$, while $Fe^{2+}$ (DMC) is responsible for the absorption of NO. The treatment of the absorbed NO and the regeneration of $Fe^{2+}$ (DMC) for recycling are similar to those described in the process applications above.

A molecule comprising both the aforementioned dimercapto moiety and an amine moiety may be synthesized for combined removal of $NO_x$ and $SO_2$ from flue gas. The amine moiety is composed of at least one primary, a secondary, and/or a tertiary amine groups. The amine moiety may be in the form of a salt or a functional group having a Pka of 4 to 7.5. The amine bisulfite salt formation is a reversible reaction. Therefore, the amine moiety is thermally regenerated to remove the $SO_2$. A stream of high concentration $SO_2$ is produced. The $SO_2$ is converted to elemental sulfur or sulfuric acid using a commercial process. On the other hand, the dimercapto moiety in the molecules plays the role of absorbing NO after coordination with ferrous ions as discussed above.

Cleanup Toxic Metal Ions

The dimercapto compounds are also used to remove toxic metal ions from scrubbing liquors through the coordination process. These metal ions include, for example, arsenic, cadmium, chromium, mercury, selenium, etc. The stability constants of dimercapto compounds with metal ions are very large. Consequently, the removal efficiency is very good. The dimercapto moiety may be contained in or on a solid such as polymer, resin, or a membrane. The separation of the solid dimercapto compounds saturated with metal ions from scrubbing liquors can be done by a conventional liquid-solid separation technique, such as precipitation, filtration. The dimercapto containing adsorbent can be regenerated by an ion-exchange method known in the art.

The present invention claims that ferrous dimercapto complexes, $Fe^{2+}$ (DMC), possess excellent properties for the removal of NO from flue gas. These properties include:
1. a large NO absorption capacity;
2. A fast rate of NO absorption;
3. resistance to oxidation by oxygen in flue gas;
4. suppressed formation of unwanted byproducts; and
5. easy regeneration of adsorbents.

The $Fe^{2+}$ (DMC) is regenerated from $Fe^{2+}$ (DMC) NO for recycling by either an electroreduction and/or a chemical reaction method. The bound NO is reduced to $NH_4^+$, $NH_3^+$ OH, $N_2$ and/or $N_2O$. The latter is cycled back to a combustion source for decomposition. An $Fe^{2+}$ (DMC) complex is used as an additive in wet desulfurization scrubbers for combined removal of $SO_2$ and $NO_x$ from flue gas. In addition, a molecule consisting of both a dimercapto group mentioned above and an amine group is synthesized for combined removal of $NO_x$ and $SO_2$ from flue gas. The amine moiety plays a role in absorbing $SO_2$ and forming an amine bisulfite salt. The amine bisulfite salt formation is a reversible reaction. Therefore, the amine moiety is thermally regenerated to remove $SO_2$. A stream of high concentration $SO_2$ is produced. The $SO_2$ is converted to elemental sulfur or to sulfuric acid using a commercial process. On the other hand, the dimercapto moiety in the molecules plays the role of absorbing NO after coordination with ferrous ions as discussed above.

METAL REDUCTION—A metal, preferably iron metal, effectively reduces iron (II) (DMPS) (NO) to form ammonium ion and to regenerate active iron (II) (DMPS) for continued NO capture. The ammonium ion optionally is stripped from the scrubbing liquor to produce ammonia for credit. The iron metal also reduces any iron (III) (DMPS) to active iron (II) (DMPS) and any oxidized form of DMPS to the reduced form of DMPS. Further, the iron metal also reduces the oxidized chelates and/or the iron (III) to their corresponding reduced forms, while iron metal is oxidized to iron (II). The iron (II) and iron (III) ions accumulate in the liquor because of oxygen present in the flue gas and results in precipitates of hydroxides of iron (II) and/or iron (III). The precipitates are readily separated from the scrubbing liquor by a conventional filtration and/or centrifuge method. The precipitates of iron (II) and iron (III) hydroxides are reduced back to iron by synthesis gas from coal or natural gas for reuse. The process steps described constitute a new scrubber system for NO removal from waste gases.

A model bench-scale spray absorber is a 4-in diameter by 5-ft long glass column. It is difficult to measure gas-liquid interfacial area per unit volume of contact zone in a small spray absorber because of the large wall effect. To obtain meaningful data from the 4-in absorber to allow better prediction of NO removal efficiency in a full-scale spray absorber, a turbulent contact absorber (TCA) approach is used. The TCA is a gas absorber containing a bed of low density spheres fluidized by the upward flow of gas while scrubbing liquor pours downward. The spheres are hollow plastic balls (having a diameter of about 10 mm) with a density below that of water. Plugging of the absorber is unlikely to occur in the fluidized bed, therefore, the fluidized bed is suitable for use in a limestone system. A 4-stage TCA is employed wherein each stage is 5.5-in high and filled with balls.

A simulated flue gas mixture with about 5% oxygen is prepared by passing liquid nitrogen from a standard pressurized 160 liter Dewar flask through a vaporizer column and mixing the nitrogen with compressed air to obtain the desired oxygen concentration. NO and $SO_2$ are blended in to give concentrations of about 100 to 600 ppm and 1500 to 2500 ppm, respectively. The gas stream flows at a rate of 15 cubic feet per minute (cfm) through an electric air heater where it is heated to a temperature of about 150° C. The heated gas then enters the base of the TCA absorber and passes upward through the spray and the downward flow of scrubbing liquor. A 40 liter stainless steel tank is used as a holding tank for the scrubbing liquor from the absorber. The holding tank temperature is controlled at about 50°–55° C. The liquor is recirculated with the centrifugal pump to the top of the absorber through a 3 gal/min spray nozzle. The pH of the scrubbing liquor is controlled by feeding an aqueous limestone and lime slurry to the holding tank. The pH range studied is between about 4.5 and 7. FIG. 16 depicts a schematic diagram of the bench-scale scrubber system. A slip stream of liquor is pumped 29 from the holding tank 27 to a regeneration system 31. The regeneration system consists of a reactor where iron metal is added to reduce the bound NO to ammonium ion and to reduce the oxidized DMPS back to the reduced form of DMPS. The temperature and the pH of the scrubbing liquor in the regeneration reactor are maintained at about 35° to 65° C. and about 3.5 to 5.5, respectively. Liquid nitrogen 11, line 12, line 13, evaporators 14 and 14A, line 15, compressed air 17, NO (31), $SO_2$ (32), flow meter 16, line 18, heater 19, line 23, produce the laboratory scale "synthetic" flue gas which enters TCA absorber 20, with liquid and solid resides moving to holding tank 27. Additional lines flow meters, etc. are shown. Stirrer 28, line 32, pump 29, flow meter 30 complete the regeneration system back to tank 27.

A $NO_x$ chemiluminescent analyzer 21 and a $SO_2$ fluorescent analyzer 21A are connected to the gas stream at various points along the system. The NO and $SO_2$ concentrations are thus measured, and the effectiveness of the absorber operation is evaluated. Scrubbing liquors are analyzed by ion chromatography (IC) and high performance liquid chromatography (HPLC), and UV-visible, infrared (IR), and laser Raman spectroscopy (LRS). The concentrations of ferrous and ferric ions are determined by the 1,10-phenanthroline colorimetric method.

The low solubility of NO in water causes the rate of NO removal to be a liquid film controlled process, see Smith, et al., "Enhanced $NO_x$ Removal in Wet Scrubbers Using Metal Chelates," (US DOE Contract DE-AC2290PC90362, Pittsburgh Energy Technology Center, 1992). A mathematical model of a liquid film controlled process has been derived. The removal efficiency of NO in terms of Number of Transfer Units (NTU) can be expressed as follows:

$$NTU = \ln(1-\% \text{ removal}/100) = \{(k(\text{iron}(II)(L))D_{NO})^{1/2}/HP_T\}\{aZ/P_MV\} \quad (1)$$

Where:
- k is a second order reaction rate constant,
- (iron(II)(L)) is the concentration of the active iron(II) chelate,
- $D_{NO}$ is the diffusivity of dissolved NO ($4.1 \times 10^{-5}$ cm$^2$/sec at 50° C.),
- H is the Henry's constant of NO,
- $P_T$ is the total pressure of flue gas (1 atm),
- a is the gas-liquid interfacial area per volume of contact zone,
- Z is the length of gas-liquid contact zone,
- $P_M$ is the molar density of flue gas (0.00235 lb-moles/ft$^3$ at 50° C.), and
- V is the flue gas velocity in the absorber.

The NTU is proportional to the square root of (iron(II)(L)); linearly proportional to a and to Z; and inversely proportional to V. Based on this mathematical model, the NTU for a full-scale absorber is calculated, given a set of operating conditions obtained from an NTU from a bench-scale test. Once obtained from the NTU, the % of NO removal in a full-scale scrubber is calculated.

The gas-liquid interfacial area per volume of contact zone "a", is better determined with a TCA than a spray absorber, especially for a small diameter absorber. (see C, Strumillo, et al., "Interfacial Area in Three—Phase Fluidized Beds", *Chemical Engineering Science*, vol 32, p. 229, 1977.) A spray absorber has a significant wall effect because the droplets hit the wall shortly after being sprayed. Further, the size of the droplets after leaving the spray nozzles can not be easily determined. A TCA is chosen for this system over a packed absorber, because plugging is likely to occur in a packed absorber using a limestone slurry. The TCA is known from the art to have a high gas-liquid contact area.

FIG. 17 shows the removal efficiency of NO from a simulated flue gas by scrubbing liquors as a function of L/G. The scrubbing liquor consists of 5% (by weight) of limestone and a 47 mM of iron (II) (DMPS). The partial pressure of NO and $SO_2$ in the flue gas are 200 ppm and 1500 ppm, respectively. The NO removal efficiency increases along with the increase of L/G. The NO removal efficiencies are 50% and 70% at an L/G of 60 and 140, respectively.

The NO concentration in flue gas ranges between 100 ppm and 400 ppm. The partial pressure of $SO_2$ is 1500 ppm. The NO removal efficiency is independent of the concentration of NO in flue gas (see FIG. 18). This is due to the fact that the concentration of dissolved NO is very small, resulting from the low solubility and very rapid reaction rate of NO with iron (II) $(DMPS)_2$. The rate of the absorption of NO is proportional to the concentration of NO in flue gas. However, the removal efficiency is independent of the inlet NO concentration.

The removal efficiency of NO shows an increase with the increase of the iron (II) (DMPS) concentration (FIG. 19). This result is consistent with that predicted from the aforementioned mathematical model, which result indicates that the NO removal efficiency expressed as NTU should increase as the square rot of the iron (II) (DMPS) concentration. The presence of $SO_2$ in flue gas does not appear to affect the absorption of NO. However, the addition of limestone in an aqueous solution of iron (II) (DMPS) scrubbing liquor results in an increase in NO absorption efficiency. This increase is attributed to the improvement of gas-liquid contact in the absorber.

In summary, the TCA experimental results are as follows:
1. The removal efficiency of NO increases along with an increase of L/G; it achieves 63% and 53% at an L/G of 118 and 70 (gpm/100 acfm), respectively with an iron (II) (DMPS) concentration of 47 mM.
2. The removal efficiency of NO is independent of the concentration of NO (100–400 ppm).
3. The removal efficiency of NO shows an increase with an increase in the concentration of iron (II) $(DMPS)_2$ (10–50 mM).

Based on the results of TCA experiments, the performance of a full-scale spray absorber in a wet limestone system is known (Table 2). The bench-scale TCA results indicates that the NO removal efficiency of 70% is achieved at an "a" of 118, L/G of 140, and Z of 1.83 ft. Based on the mathematical model, "a" is calculated to be about 15, if the droplet diameter is 2 min. Assuming a Z of 60 ft and L/G of 140, the NTU is calculated to be 0.5, which is equivalent of a NO removal efficiency of 40%. If the droplets size is reduced from 2 to 1.5 mm, then "a" increases from 15 and 35 and the NTU becomes 1.17, which value corresponds to a removal efficiency of 69%. Further reduction of the droplet size increases the removal efficiency of NO. However, if the droplet size is too small, many of droplets are carried up with the flue gas in a countercurrent absorber, and results in the entrainment of the liquor. In a co-current spray absorber, the droplet diameter is reduced to 0.4 mm, corresponding to an "a" value of 47. Assuming all other operating conditions remain the same, an NTU is calculated to be 1.56, which is equivalent to a NO removal efficiency of 79%.

TABLE 2

| Absorber | $d_p$ (mm) | a (ft²/ft³) | Z (ft) | V (ft/s) | NTU | NO (%) |
|---|---|---|---|---|---|---|
| 4" TCA | | 118 | 1.83 | 1 | 1.2 | 70. |
| Spray absorber (counter current) | 2 | 15 | 40 | 10 | 0.33 | 28 |
| | 2 | 15 | 60 | 10 | 0.50 | 40 |
| | 1.5 | 35 | 40 | 10 | 0.78 | 54 |
| | 1.5 | 35 | 60 | 10 | 1.17 | 69. |
| Spray absorber (co-current) | 0.5 | 47 | 40 | 10 | 1.03 | 64 |
| | 0.5 | 47 | 60 | 10 | 1.56 | 79. |

*[Fe(II)(DMPS)] = 47 mM; L/G = 140 (gpm/1000 acfm)

An integrated test of the system (FIG. 21) is presented. Much of FIG. 16 is repeated. This test encompasses the absorption of $SO_2$ and NO into a scrubber, the removal of solid wastes, the regeneration of iron (II) (DMPS), and the stripping of ammonia. The system of FIG. 21 consists of a TCA absorber 20, a holding tank 27, a thickener 37, filters 41, a regeneration reactor 40, and a stripper 35. A steady state removal of NO is maintained during the entire period of a reaction, which usually lasts several hours. The steady state NO removal efficiency depends on the flow rate of liquor taken out into the regeneration loop, and the conditions used in the regeneration reactor. FIG. 20 shows two consecutive operating conditions over a 16.5 hr period:

1. the first 4 hrs were conducted without the regeneration of the liquor, and
2. the regeneration of liquor was started and continued for the rest of the experiment.

This experiment is carried out at: initial NO and $SO_2$ concentrations of 250 and 1500 ppm, respectively; a partial pressure of 5% oxygen; an L/G of 105 gpm/1000 acfm; an initial concentration of 50 mM iron (II) (DMPS); and at 55° C. The flow rate of scrubbing liquor into the regeneration loop and the absorption loop is 0.05–0.1 (gallons per minute) gpm and 1.5 gpm, respectively. The results show that an initial NO removal efficiency of 60% is achieved. This efficiency decreased gradually to about 20% after running for 4 hrs. Upon regeneration, the NO removal efficiency increases and stabilizes at between 43 and 51%, depending on the operating conditions employed in the regeneration system. Further improvement of the NO removal efficiency is achieved by: 1. increasing the flow rate of liquor into the regeneration loop; 2. by increasing the reaction time; 3. optionally increasing the temperature in the regeneration reactor; and 4. by properly controlling the pH of the liquor. The integrated experiments demonstrate that the regeneration method works effectively.

Batch studies of the nitrosyl reduction process are also performed. Iron metal powder is capable of rapidly reducing the NO bound to ferrous ligands to ammonium ions. The overall reaction is written as:

$$2.5\ Fe^0 + Fe^2(L)(NO) + 6H^{3O} \rightarrow 2.5\ Fe^{2+} + Fe^{2+}(L) + NH_4^+ + H_2O \quad (2A)$$

(where L in the equation represents a ligand bound to iron (II)) The process is dependent on a number of system conditions, including pH, temperature, concentration of the nitrosyl, surface area of the metal, and degree of agitation. Because the reaction is heterogeneous, it is dependent on the contact between the iron particles and the solution. The reaction is monitored either by the rate of ferrous ion increase (by 1,10-phenanthroline colorimetry) or by the rate of $NH_4^+$ formation (ion chromatography). The measurement methods are reasonably consistent with one another, and the rate of ferrous ion formation is about 2.5 times the rate of ammonium ion formation when both are measured, as is expected from the stoichiometry of the reaction above. At ambient temperature, a rapidly-mixed solution of 10 mM $Fe^{2+}(DMPS)_2NO$ (pH5) with iron metal has an initial reaction rate of $2 \times 1^{-3}$ M/min for $NH_4^+$ production. With less efficient mixing, the initial reaction is more than an order of magnitude slower. The conversion is essentially quantitative, as is shown in FIG. 22, for a mixture of 10 mM Fe (II) (EDTA) NO mixed with excess iron powder at pH 5 and 25° C. Our experiments also indicate that the ligand used in the system also influences the rate of reduction, e.g. the reduction of Fe (II) (EDTA) NO is significantly faster than the reduction of Fe (II) $(DMPS)_2NO$ when the reaction conditions are the same.

The iron oxyhydroxide solid generated in the reduction of oxidized DMPS is chemically similar to the iron ore used in steel making. Iron oxyhydroxide is reduced back to metallic iron with a process based on the smelting of iron. A source of carbon, such as coal or coke, is heated to generate carbon monoxide and to reduce carbon dioxide back to carbon monoxide. The carbon monoxide reacts with the iron oxides to produce iron metal.

Below are a few reactions that describe the reduction process:

$$C + \tfrac{1}{2}O_2 \rightarrow CO \quad (3A)$$

$$Fe_3O_4 + CO \rightarrow Fe + CO_2 \quad (4A)$$

$$FeO + CO \rightarrow Fe + CO_2 \quad (5A)$$

$$C + CO_2 \rightarrow CO + CO \quad (6A)$$

Reactions 4A and 5a are equilibria that are dependent on temperature and also on the partial pressures of CO and $CO_2$. Reacton 4A favors the products more at a lower temperature (about 500° C), while reaction 5A is more favorable at a higher temperature (between 800° and 1100° C.).

Coal is used in the reduction of iron oxyhydroxide generated by oxidized DMPS reduction. By heating coal with a suitable amount of air at 450°–600° C., carbon monoxide is generated. The carbon monoxide and excess coal are mixed with the iron oxyhydroxide solid at a temperature of between about 400° to 800° C. preferably 500° to 700° C. With sufficient excess carbon monoxide, essentially all of the iron is reduced to metallic form. By keeping the temperature well below the melting point of iron (about 1150° C. for cast iron), it is possible to regenerate the metal in powder form. The excess carbon monoxide and residual coal are sent to the broiler for use as a combination fuel.

Impurities in the solid generated by the reduction of oxidized DMPS should not interfere with the process. At elevated temperatures, residual water present in the solids reacts with coal to generate carbon monoxide and hydrogen, i.e.:

$$C + H_2O \rightarrow CO + H_2 \quad (7A)$$

These products contribute to the reduction of the iron. Limestone from the scrubber does not interfere in the process, since limestone is included in the smelting process. Limestone is calcined to lime at elevated temperatures, i.e.:

$$CaCO_3 \rightarrow CaO + CO_2 \quad (8A)$$

Lime reacts with residual sulfur present to avoid problems with pyrite formation, i.e.:

$$FeS + CaO + C \rightarrow Fe + Fe + CaS + Co \quad (9A)$$

The overall process only requires coal and a modest amount of heat to regenerate iron for the reduction of oxidized DMPS.

The reagent loss due to water entrainment in solid waste needs to be discussed. Under natural oxidation conditions, solid precipitates occlude as much as 50% by weight of liquor and contribute to the loss of reagent, a wet limestone scrubber that removes 90% $SO_2$ from flue gas containing 2000 ppm $SO_2$ in a 500 megawatt (MW) coal-fired power plant, would also consume 2.7 short tons of DMPS per day due to entrainment, assuming the scrubbing liquor contains 20 mM DMPS. This loss of DMPS may be reduced by washing the filter cake to recover the reagent. Under forced oxidation conditions where gypsum is precipitated, the reagent loss due to entrainment is only one fifth of that under the natural oxidation conditions, because the gypsum precipitate occludes only about 10% by weight of liquors. However, aeration under forced oxidation accelerates the oxidation of iron (II) (DMPS). To overcome this problem, the forced oxidation aeration is performed after the extraction of entrained liquors. FIG. 8 shows the flow diagram of the process, including the extraction of liquor entrained in solid waste to recover the reagent, and also the forced oxidation (to produce gypsum) performed downstream after extraction. Subsequently, the scrubbing liquor is regenerated by a chemical reduction method.

In conclusion, the iron (II) (DMPS) additive can be retrofitted to existing FGD scrubbers. A removal efficiency for NO of 50% achievable, and this value may reach 70% or more under suitable conditions. The new iron (II) (DMPS) additive does not produce undesirable nitrogen-sulfur compounds. The reagent loss due to solid wastes entrainment may need optimization. The regeneration of scrubbing liquor by iron metal is described.

The following Examples are presented to be descriptive and explanatory only. They are not to be construed as being limiting in any way.

Materials—Most of reagents used in this study were commercially available and were used as received. The chemicals and reagents are available from chemical supply houses, such as Aldrich Chemicals, Milwaukee, Wis. or sources are identified from *Chemical Sources U.S.A.* published annually by Directories Publishing, Inc. of Boca Ratan, Fla. These include: 2, 3-dimercapto-1-propanesulfonate (DMPS), dithiooxalate (DTO), 2, 3-dimercapto-1, 4-butanediol (DMBDO), 2, 3-dimercaptosuccinate (DMSC), cysteamine-HCl (2-aminoethanethiol-hydrochloride), sodium citrate dihydrate, ethlyenediaminethetraacetic acid (EDTA), Fe$(NH_4)_2$ $(SO_4)_2 \cdot 6H_2O$; $FeCl_2 \cdot 4H_2O$; $FeCl_3$, $Na_2B_4O_7 \cdot 10H_2O$, $Na_2SO_3$, $Na_2SO_4$, NO gas (2.5% in $N_2$), NO standard gas (680 ppm in $N_2$), $O_2$, and $N_2$ gas.

Some compounds of interest, with the aforementioned "dimercapto groups" moiety, were not available commercially. Some of them were synthesized. These include 2, 3-dimercapto-1, 4-Butanedisulfonate and 1, 2-dimercapto-3, 4-butanedisulfonate.

EXAMPLE 1

2,3-DIMERCAPTO-1,4-BUTANEDISULFONATE (2, 3-DMBDS)

1, 4-dibromo-2-butene is added to an aqueous solution of sodium sulfite at 60° C. This mixture is stirred using a magnetic stirrer at 60° C. until the organic phase disappeared, and a clear aqueous solution is obtained. This solution is evaporated to obtain a solid mixture of 2-butene-1, 4-disulfonate and sodium bromide.

Acetic acid is added to the solid mixture at ambient temperatures to dissolve 2-butene-1, 4-disulfonate. Subsequently, bromine is added dropwise to the solution at between 10°–15° C. to produce 2, 3-dibromo-1, 4-butane disulfonate. The solution is concentrated under reduced pressure. Diethyl ether is added to the solution to precipitate the dibromide product, which may contain a trace amount of NaBr. The dibromide product is purified by recrystallization using isopropanol.

Sodium hydrogen sulfide is added to an aqueous solution of 2, 3-dibromo-1, 4-butane disulfonate at ambient temperature in a flask. This aqueous mixture is stirred and undergoes a reaction to produce 2, 3-DMBDS.

The 2, 3-DMBDS is purified with the following sequential steps:
1. removal of excess NaHS by acidification of the solution with acetic acid to evolve $H_2S$; the solution was continuously bubbled with carbon dioxide to strip the remaining hydrogen sulfide from the solution.
2. Lead acetate is added to precipitate the complexes of lead 2, 3-DMBDS which is separated from the solution.
3. 2, 3-DMBDS is dissolved in concentrated sulfuric acid (20%) aqueous solution.
4. Vacuum evaporization obtains the sodium salt of 2, 3-DMBDS, after the neutralization of the solution by $Na_2CO_3$; and
5. Extraction of 2, 3-DMBDS with ethyl alcohol, and followed by recrystallization to obtain sodium salt of 2, 3-DMBDS.

EXAMPLE 2

1,2-DIMERCAPTO-3, 4-BUTANEDISULFONATE (1, 2-DMBDS)

The procedure to synthesize 1, 2-DMBDS is similar to 2, 3-DMBDS.

3, 4-Dichloro-1-butene is added to an aqueous solution of sodium sulfite to produce 1-butene-3, 4-disulfonate.

Bromine is added dropwise to an acetic acid solution of 1-butene-3, 4-disulfonate at 10° to 15° C. to produce 1, 2-dibromobutane-3, 4-disulfonate.

Sodium hydrogen sulfide is reacted at ambient temperature with an aqueous solution of 1, 2-dibromobutane-3, 4-disulfonate to form 1, 2-DMBDS.

The purification of 1, 2-DMBDS is performed according to those described for 2, 3-DMBDS above.

EXAMPLE 3

ABSORPTION OF NO—BUBBLING PROCESS (a) The removal of NO from a simulated flue gas by metal chelate solutions was performed with two different types of gas scrubbers: bubbling and spray tower absorbers. In a typical bubbling experiment (FIG. 1 ), a batch of scrubbing liquors was bubbled through by a continuous flow of gas mixture.

A 100 ml aqueous solution containing 0.005 to 0.05 M ferrous salts (Fe($NH_4$)$_2$($SO_4$)$_2 \cdot 4H_2O$), 0.005 to 0.1 M chelate DMC, and a buffer was placed in a PYREX® column (50 mm inner diameter×210 mm long). Most of the experiments were performed with a molar ratio of DMC to ferrous ions of 2 unless specified otherwise. The pH of the solution was adjusted to the desired value (pH 3 to 10) by dropwise addition of either sodium hydroxide solution or concentrated sulfuric acid, and the reaction system was thermostated. Most of the experiments were performed at 55° C., while some of the experiments were done at 25°, 75°, and 95° C. The experiment was performed by bubbling a simulated flue gas stream through the ferrous chelate solutions. A simulated flue gas was composed of between 300 and 700 ppm NO, between 0% and 8% $O_2$, and the balance was nitrogen. The gas flow rate was about 1-L/min, corresponding to a contact time of flue gas with scrubbing liquors of approximately 6 sec. The NO concentration in the outlet gas was measured by a Thermoelectron Model 14A chemiluminescent $NO_x$ analyzer.

The absorption of NO was carried out until the NO concentration in the outlet gas became equal to that of the inlet gas, i.e., until saturation was reached.

(b) The process of subpart 3(a) is performed wherein the ligand DMC is independently selected from DMPS, DMBDS, DMBS, DEBS, DMBDO or DTO.

EXAMPLE 4

ABSORPTION OF NO—SPRAY TOWER PROCESS (a) A typical spray tower experiment (FIG. 2) was carried out in a 10 cm diameter by 120 cm long glass column installed with spray nozzles. Ten nozzles (0.2-L/min per nozzle) were divided into two parallel rows with each row containing 5 nozzles in series. A ferrous DMC chelate solution was sprayed in the absorber. A countercurrent flow of flue gas entered at the base of the absorber and passed upward through the failing spray of solution. The simulated flue gas mixture with about 5% oxygen contained 300–700 ppm NO. The gas stream flowed, at a rate of 140–280-L/min, through an electric air heater where it was heated to a temperature of 150°–175° C. The heated gas then entered the absorber. The contact time of flue gas with spraying solution was approximately 1 to 4 sec.

(b) The process of subpart 3(a) is performed wherein the ligand DMC is independently selected from DMPS, DMBDS, DMBS, DEBS, or DMBDO.

EXAMPLE 5

CHEMICAL REGENERATION

Ferrous chelates are oxidized by $O_2$ in flue gas to form ferric chelates, which are inactive in NO absorption. The ability of DMC to regenerate ferrous from ferric ions was demonstrated by two kind of experiments.

(a) The first experiment involved the measurement of NO absorption capacity as function of the molar ratio of DMC to ferrous ions in solutions. This ratio ranged from 1 to 8. A simulated flue gas containing about 500 to 650 ppm NO, 5% oxygen and the balance nitrogen was used. The NO absorption capacity increased with an increase in molar ratio of DMC to ferrous ions, indicating the ability of DMC to reduce ferric ions to ferrous ions.

(b) The second experiment involved the use of a solution containing a ferric salt and a DMC to absorb NO. Because ferric chelates do not coordinate NO, a positive NO absorption result indicates that DMC was capable of reducing ferric to ferrous ions.

EXAMPLE 6

REGENERATION OF $Fe^{2+}$ (DMC) NO

The regeneration of $Fe^{2+}$ (DMC) from the NO saturated scrubbing liquors, i.e. $Fe^{2+}$ (DMC) NO, by chemical reagents was determined by two different types of experiments.

(a) The first type involves the addition of a chemical additive, such as cysteamine, to an $Fe^{2+}$ (DMC) solution before an NO absorption experiment was performed. The increase of NO absorption capacity by the solution with an additive compared to without is indicative of the regenerative ability of the chemical additive.

(b) The second type of experiment involved the addition of a chemical additive into an NO saturated $Fe^{2+}$ (DMC) solution and allowing several minutes of reaction before another NO absorption experiment was conducted. The revival of NO absorption by the solution indicates that the chemical additive employed is effective in the regeneration of $Fe^{2+}$ (DMC) from $Fe^{2+}$ (DMC) NO, by reacting with the bound NO.

EXAMPLE 7

ELECTROREGENERATION

An electrochemical cell consisting of two 250 ml round-bottom flasks connected by a "CELLGARD®" membrane was set up as shown in FIG. 3. In a typical experiment, the NO saturated and $O_2$ oxidized sorbent liquor (100 ml) was poured into the half-cell containing a graphite working electrode (area: about 4 $cm^2$) and the saturated calomel reference electrode (SCE). Nitrogen bubbling through the scrubber solution was then initiated. The electrolyte was $Na_2SO_4$ (0.1 M), added to both half-cells. Since there is $OH^-$ generation at the working electrode and $H^+$ generation at the Pt counter electrode (area: about 2 $cm^2$), a buffer of sodium borate or citrate was also added. Electroreduction was initiated at an applied voltage of 10 V (0.1 to 0.5 amp) from the DC power supply. The potential across the working electrode, $E_{C-SCE}$, was monitored with the aid of a high-impedance voltmeter to ensure that it did not exceed −0.41 V, when reduction of $Fe^{2+}$ to $Fe^0$ was likely to occur.

EXAMPLE 8

TOXIC METAL REMOVAL (a) A compound of the structure $HSCH_2$—$CH(NH_2)$ $CH_2SH$ is covalently bonded through the —NH group to a solid surface of a water-insoluble a styrene-divinyl benzene copolymer having pendant —$CH_2Cl$ groups attached to the phenyl ring as described by H. W. Blanch, et al. in U.S. Pat. No. 5,073,575.

Multiple dimercapto groups are formed. The solid is contacted with an aqueous solution of cadmium or chromium ion for 1 hr.

(b) The solid ligand and metal ion reduced solution are separated;

(c) The solid ligand is contacted with aqueous hydrochloric acid to remove metal ion and to regenerate active (DMC').

While only a few embodiments of the invention have been shown and described herein, it will become apparent to those skilled in the art that various modifications and changes can be made in the metal ion chelate process to remove pollutants from fluids reduction of NO, using a metal particle, regeneration of active chelate using a metal powder, or for the removal of hazardous metal ions from fluids without departing from the spirit and scope of the present invention. All such modifications and changes coming within the scope of the appended claims are intended to be carried out thereby.

We claim:

1. An improved process to regenerate iron (II) (CHELATE) by reduction of NO in iron (II) (CHELATE) (NO) complex, which process comprises:

a) contacting an aqueous solution containing iron (II) (CHELATE) (NO) with metal particles selected from the group consisting or iron, tin, and zinc at between about 20° and 90° C. to reduce the NO present to produce ammonia or an ammonium ion, and also to produce free iron (II) (CHELATE), wherein said reduction occurs at a pH of between about 3 and 8.

2. The improved process of claim 1 wherein the CHELATE is selected from EDTA, DMPS, citrate, or nitrilotriacetic acid.

3. The improved process of claim 2 wherein the metal particles are of a size of between about 0.5 inches and 50 micron in diameter.

4. The improved method of claim 2 which further includes after step a) step b) as follows:

b) the ammonium ion is removed from the aqueous solution as gaseous ammonia.

5. The improved process of claim 1 which further includes after step a) step c) as follows:

c) contacting the aqueous iron (III) (CHELATE) including any oxidized form of the CHELATE in solution of step (a) with iron metal particles of between about 0.5 inch and 0.1 inch in size at between about 20° and 90° C. for between about 0.1 sec and 1 hr to regenerate iron (II) CHELATE.

6. An improved process of claim 1 wherein in step a) $Fe(OH)_2$ or $Fe(OH)_3$ is present or is produced, the process further comprises:

aa) separating the solid $Fe(OH)_2$, $Fe(OH)_3$, or mixtures thereof as found in step a); and bb) contacting the separated $Fe(OH)_2$, $Fe(OH)_3$, or mixtures thereof at between 400° and 800° C. with sufficient synthesis gas to produce iron metal.

7. The process of claim 1 wherein the CHELATE is EDTA or DMPS, and the reducing metal is iron.

8. The improved process of claim 1 wherein the CHELATE is ethylenediaminetetraceticacid (EDTA).

9. The improved process of claim 1 wherein the CHELATE is 2, 3-dimercapto-1-propanesulfonate (DMPS).

10. The improved process of claim 1 wherein the CHELATE is citrate.

11. The improved process of claim 1 wherein the CHELATE is nitrilotriacetic acid.

12. The improved process of claim 1 wherein the metal is iron.

13. The improved process of claim 1 wherein the metal is tin.

14. The improved process of claim 1 wherein the metal is zinc.

15. The improved process of claim 1 wherein the metal is iron; and the CHELATE is EDTA.

16. The improved process of claim 1 wherein the metal is iron; and the CHELATE is DMPS.

17. The improved process of claim 1 wherein the metal is iron; and the CHELATE is nitrilotriacetic acid.

18. The improved process of claim 1 wherein the metal is iron; and the CHELATE is citrate.

* * * * *